US009262895B2

(12) United States Patent
Rodgers et al.

(10) Patent No.: US 9,262,895 B2
(45) **Date of Patent: *Feb. 16, 2016**

(54) GAMING SYSTEM, GAMING DEVICE, AND METHOD FOR PROVIDING A CASCADING SYMBOLS GAME HAVING MAGNETIC SYMBOLS AND TARGET SYMBOLS

(71) Applicant: IGT, Las Vegas, NV (US)

(72) Inventors: Paulina Rodgers, Reno, NV (US); Benjamin C. Hoffman, Reno, NV (US); Christmas C. Parker, Reno, NV (US)

(73) Assignee: IGT, Las Vegas, NV (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/177,996

(22) Filed: Feb. 11, 2014

(65) Prior Publication Data

US 2014/0162756 A1 Jun. 12, 2014

Related U.S. Application Data

(63) Continuation of application No. 12/270,553, filed on Nov. 13, 2008, now Pat. No. 8,662,986.

(51) Int. Cl.
*A63F 9/24* (2006.01)
*A63F 13/00* (2014.01)
(Continued)

(52) U.S. Cl.
CPC ............ *G07F 17/34* (2013.01); *G07F 17/3262* (2013.01); *G07F 17/3265* (2013.01)

(58) Field of Classification Search
USPC ............................................................ 463/20
See application file for complete search history.

(56) References Cited

U.S. PATENT DOCUMENTS

| | | | |
|---|---|---|---|
| 1,564,746 | A | 12/1925 | Barnard |
| 1,978,395 | A | 10/1934 | Groetchen |

(Continued)

FOREIGN PATENT DOCUMENTS

| | | |
|---|---|---|
| AU | 710015 B2 | 9/1997 |
| AU | 722969 | 6/1998 |

(Continued)

OTHER PUBLICATIONS

50 Lions, written by videoslotmachines.com, published prior to 2007.

(Continued)

*Primary Examiner* — Kevin Y Kim
(74) *Attorney, Agent, or Firm* — Neal, Gerber & Eisenberg LLP

(57) ABSTRACT

A gaming system displays one of a plurality of symbols in each of a plurality of symbol positions, at least one of the plurality of symbols being a target symbol for establishing a direction of shifting and at least one of the plurality of symbols being a magnetic symbol for shifting toward a target symbol. If any generated magnetic symbol is associated with a generated target symbol, the gaming system shifts that magnetic symbol toward the associated target symbol, resulting in an empty symbol position. The gaming system fills the empty symbol position by shifting a displayed symbol or by generating one of the plurality symbols and repeats until no magnetic symbol is associated with a target symbol. The gaming system provides an award for any displayed winning symbol combination. The gaming system removes symbols from each winning combination, fills the empty symbol positions, and repeats as above.

20 Claims, 16 Drawing Sheets

(51) Int. Cl.
*G06F 17/00* (2006.01)
*G06F 19/00* (2011.01)
*G07F 17/34* (2006.01)
*G07F 17/32* (2006.01)

(56) References Cited

U.S. PATENT DOCUMENTS 3,420,525 A 1/1969 Waders
3,642,287 A 2/1972 Lally et al.
3,735,987 A 5/1973 Ohki
3,977,681 A 8/1976 Deitrich
4,099,722 A 7/1978 Rodesch et al.
4,114,890 A 9/1978 Yamamoto et al.
4,171,814 A 10/1979 Tamano
4,198,052 A 4/1980 Gauselmann
4,200,291 A 4/1980 Hooker
4,326,351 A 4/1982 Heywood et al.
4,357,567 A 11/1982 Rock
4,448,419 A 5/1984 Telnaes
4,573,681 A 3/1986 Okada
4,636,951 A 1/1987 Harlick
4,651,996 A 3/1987 Watkins et al.
4,695,053 A 9/1987 Vazquez, Jr. et al.
4,790,537 A 12/1988 Smyth et al.
4,826,169 A 5/1989 Bessho et al.
4,838,552 A 6/1989 Hagiwara
4,874,173 A 10/1989 Kishishita
5,019,973 A 5/1991 Wilcox et al.
5,152,529 A 10/1992 Okada
5,205,555 A 4/1993 Hamano
RE34,244 E 5/1993 Hagiwara
5,308,065 A 5/1994 Bridgeman et al.
5,332,228 A 7/1994 Schultz
5,364,100 A 11/1994 Ludlow et al.
5,393,061 A 2/1995 Manship et al.
5,395,111 A 3/1995 Inoue
5,423,539 A 6/1995 Nagao
5,431,408 A 7/1995 Adams
5,449,173 A 9/1995 Thomas et al.
5,564,700 A 10/1996 Celona
5,580,053 A 12/1996 Crouch
5,584,764 A 12/1996 Inoue
5,609,524 A 3/1997 Inoue
5,611,535 A 3/1997 Tiberio
5,624,119 A 4/1997 Leake
5,664,998 A 9/1997 Seelig et al.
5,704,835 A 1/1998 Dietz
5,720,662 A 2/1998 Holmes et al.
5,722,891 A 3/1998 Inoue
5,752,881 A 5/1998 Inoue
5,766,074 A 6/1998 Cannon et al.
5,769,716 A 6/1998 Saffari et al.
5,772,506 A 6/1998 Marks et al.
5,807,172 A 9/1998 Piechowiak
5,813,911 A 9/1998 Margolin
5,823,873 A 10/1998 Moody
5,833,238 A 11/1998 Watanabe
5,833,536 A 11/1998 Davids et al.
5,833,537 A 11/1998 Barrie
5,863,249 A 1/1999 Inoue
5,882,260 A 3/1999 Marks et al.
5,927,714 A 7/1999 Kaplan
5,935,002 A 8/1999 Falciglia
5,951,397 A 9/1999 Dickinson
5,980,384 A 11/1999 Barrie
5,984,782 A 11/1999 Inoue
5,997,400 A 12/1999 Seelig et al.
5,997,401 A 12/1999 Crawford
6,027,115 A 2/2000 Griswold et al.
6,033,307 A 3/2000 Vancura
6,056,642 A 5/2000 Bennett
6,059,289 A 5/2000 Vancura
6,059,658 A 5/2000 Mangano et al.
6,086,066 A 7/2000 Takeuchi et al.
6,089,976 A 7/2000 Schneider et al.
6,089,977 A 7/2000 Bennett
6,093,102 A 7/2000 Bennett
6,095,921 A 8/2000 Walker et al.
6,117,013 A 9/2000 Eiba
6,120,031 A 9/2000 Adams
6,120,376 A 9/2000 Cherry
6,120,377 A 9/2000 McGinnis et al.
6,142,875 A 11/2000 Kodachi et al.
6,149,521 A 11/2000 Sanduski
6,159,095 A 12/2000 Frohm et al.
6,159,096 A 12/2000 Yoseloff
6,174,235 B1 1/2001 Walker et al.
6,190,254 B1 2/2001 Bennett
6,203,009 B1 3/2001 Sines et al.
6,220,959 B1 4/2001 Holmes, Jr. et al.
6,224,484 B1 5/2001 Okuda et al.
6,227,971 B1 5/2001 Weiss
6,241,607 B1 6/2001 Payne et al.
6,251,013 B1 6/2001 Bennett
6,254,481 B1 7/2001 Jaffe
6,261,178 B1 7/2001 Bennett
6,270,411 B1 8/2001 Gura et al.
6,270,412 B1 8/2001 Crawford et al.
6,290,600 B1 9/2001 Glasson
6,299,165 B1 10/2001 Nagano
6,299,170 B1 10/2001 Yoseloff
6,302,398 B1 10/2001 Vecchio
6,302,429 B1 10/2001 Friedrich
6,305,686 B1 10/2001 Perrie et al.
6,311,976 B1 11/2001 Yoseloff et al.
6,315,660 B1 11/2001 DeMar et al.
6,315,663 B1 11/2001 Sakamoto
6,318,721 B1 11/2001 Randall et al.
6,319,124 B1 11/2001 Baerlocher et al.
6,322,078 B1 11/2001 Adams
6,347,996 B1 2/2002 Gilmore et al.
6,358,144 B1 3/2002 Kaddlic et al.
6,364,766 B1 4/2002 Anderson et al.
6,375,570 B1 4/2002 Poole
6,394,902 B1 5/2002 Glavich et al.
6,398,644 B1 6/2002 Perrie et al.
6,409,172 B1 6/2002 Vancura
6,409,602 B1 6/2002 Wilshire et al.
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,439,993 B1 8/2002 O'Halloran
6,439,995 B1 8/2002 Hughs-Baird et al.
6,454,266 B1 9/2002 Breeding et al.
6,464,581 B1 10/2002 Yoseloff et al.
6,481,713 B2 11/2002 Perrie et al.
6,494,454 B2 12/2002 Adams
6,506,114 B1 1/2003 Estes et al.
6,514,141 B1 2/2003 Kaminkow et al.
6,517,432 B1 2/2003 Jaffe
6,517,433 B2 2/2003 Loose et al.
6,551,187 B1 4/2003 Jaffe
6,558,254 B2 5/2003 Baelocher et al.
6,561,900 B1 5/2003 Baerlocher et al.
6,561,904 B2 5/2003 Locke et al.
6,565,433 B1 5/2003 Baerlocher et al.
6,575,830 B2 6/2003 Baerlocher et al.
6,585,591 B1 7/2003 Baerlocher et al.
6,589,114 B2 7/2003 Rose
6,602,136 B1 8/2003 Baerlocher et al.
6,602,137 B2 8/2003 Kaminkow et al.
6,604,740 B1 8/2003 Singer et al.
6,616,142 B2 9/2003 Adams
6,632,139 B1 10/2003 Baerlocher
6,632,140 B2 10/2003 Berman et al.
6,634,945 B2 10/2003 Glavich et al.
6,641,477 B1 11/2003 Dietz
6,643,943 B2 11/2003 Dall'Aglio et al.
6,644,663 B2 11/2003 Seelig et al.
6,659,864 B2 12/2003 McGahn et al.
6,666,767 B1 12/2003 Dayan
6,672,960 B1 1/2004 B-Jensen

(56) References Cited

U.S. PATENT DOCUMENTS

| | | | |
|---|---|---|---|
| 6,676,511 | B2 | 1/2004 | Payne et al. |
| 6,676,512 | B2 | 1/2004 | Fong et al. |
| 6,695,696 | B1 | 2/2004 | Kaminkow |
| 6,702,671 | B2 | 3/2004 | Tarantino |
| 6,702,675 | B2 | 3/2004 | Poole et al. |
| 6,712,693 | B1 | 3/2004 | Hettinger |
| 6,719,630 | B1 | 4/2004 | Seelig et al. |
| 6,726,204 | B2 | 4/2004 | Inoue |
| 6,731,313 | B1 | 5/2004 | Kaminkow |
| 6,733,386 | B2 | 5/2004 | Cuddy et al. |
| 6,758,747 | B2 | 7/2004 | Baerlocher |
| 6,780,109 | B2 | 8/2004 | Kaminkow |
| 6,786,820 | B2 | 9/2004 | Gerrard et al. |
| 6,802,775 | B2 | 10/2004 | Baerlocher et al. |
| 6,805,349 | B2 | 10/2004 | Baerlocher et al. |
| 6,808,454 | B2 | 10/2004 | Gerrard et al. |
| 6,817,944 | B2 | 11/2004 | Kaminkow et al. |
| 6,832,957 | B2 | 12/2004 | Falconer |
| 6,835,133 | B2 | 12/2004 | Baerlocher et al. |
| 6,837,788 | B2 | 1/2005 | Cannon |
| 6,855,054 | B2 | 2/2005 | White et al. |
| 6,866,583 | B2 | 3/2005 | Glavich et al. |
| 6,875,106 | B2 | 4/2005 | Weiss et al. |
| 6,880,826 | B2 | 4/2005 | Inoue |
| 6,896,615 | B2 | 5/2005 | Berman |
| 6,896,617 | B2 | 5/2005 | Daly |
| 6,905,405 | B2 | 6/2005 | McClintic |
| 6,905,406 | B2 | 6/2005 | Kaminkow et al. |
| 6,908,383 | B2 | 6/2005 | Baerlocher et al. |
| 6,910,962 | B2 | 6/2005 | Marks et al. |
| 6,913,533 | B2 | 7/2005 | Cuddy et al. |
| 6,918,832 | B2 | 7/2005 | Baerlocher et al. |
| 6,921,335 | B2 | 7/2005 | Rodgers et al. |
| 6,923,441 | B2 | 8/2005 | Inoue |
| 6,929,952 | B2 | 8/2005 | Baerlocher |
| 6,932,700 | B2 | 8/2005 | Bennett et al. |
| 6,939,223 | B1 | 9/2005 | Jones |
| 6,942,571 | B1 | 9/2005 | McAllister et al. |
| 6,942,572 | B2 | 9/2005 | Inoue |
| 6,958,013 | B2 | 10/2005 | Miereau et al. |
| 6,960,133 | B1 | 11/2005 | Marks et al. |
| 6,971,955 | B2 | 12/2005 | Baerlocher et al. |
| 6,976,915 | B2 | 12/2005 | Baker et al. |
| 6,979,263 | B2 | 12/2005 | Baerlocher et al. |
| 6,981,635 | B1 | 1/2006 | Hughs-Baird et al. |
| 6,986,710 | B2 | 1/2006 | Baerlocher et al. |
| 6,988,947 | B2 | 1/2006 | Baerlocher et al. |
| 6,991,538 | B2 | 1/2006 | Cannon |
| 6,997,804 | B2 | 2/2006 | Berman |
| 6,997,808 | B2 | 2/2006 | Rodgers et al. |
| 7,001,274 | B2 | 2/2006 | Baerlocher et al. |
| 7,014,559 | B1 | 3/2006 | Fong |
| 7,014,560 | B2 | 3/2006 | Glavich et al. |
| 7,018,293 | B2 | 3/2006 | Brown et al. |
| 7,040,985 | B2 | 5/2006 | Vancura |
| 7,048,275 | B2 | 5/2006 | Adams |
| 7,052,395 | B2 | 5/2006 | Glavich et al. |
| 7,056,213 | B2 | 6/2006 | Ching et al. |
| 7,070,502 | B1 | 7/2006 | Bussick et al. |
| 7,074,127 | B2 | 7/2006 | Cuddy et al. |
| 7,077,744 | B2 | 7/2006 | Cannon |
| 7,077,745 | B2 | 7/2006 | Gomez et al. |
| 7,090,580 | B2 | 8/2006 | Rodgers et al. |
| 7,094,148 | B2 | 8/2006 | Baerlocher et al. |
| 7,104,886 | B2 | 9/2006 | Baerlocher et al. |
| 7,104,888 | B2 | 9/2006 | Miereau et al. |
| 7,108,602 | B2 | 9/2006 | Daly |
| 7,137,888 | B2 | 11/2006 | Glavich et al. |
| 7,144,322 | B2 | 12/2006 | Gomez et al. |
| 7,153,205 | B2 | 12/2006 | Baerlocher |
| 7,160,186 | B2 | 1/2007 | Cuddy et al. |
| 7,160,187 | B2 | 1/2007 | Loose et al. |
| 7,168,704 | B1 | 1/2007 | Lawless |
| 7,169,042 | B2 | 1/2007 | Muir et al. |
| 7,192,345 | B2 | 3/2007 | Muir et al. |
| 7,195,559 | B2 | 3/2007 | Gilmore et al. |
| 7,204,753 | B2 | 4/2007 | Ozaki et al. |
| 7,226,359 | B2 | 6/2007 | Bussick et al. |
| 7,236,113 | B1 | 6/2007 | Wang |
| 7,252,591 | B2 | 8/2007 | Van Asdale |
| 7,252,592 | B2 | 8/2007 | Rodgers et al. |
| 7,275,988 | B2 | 10/2007 | Aida et al. |
| 7,294,058 | B1 | 11/2007 | Slomiany et al. |
| 7,309,281 | B2 | 12/2007 | Baerlocher et al. |
| 7,309,282 | B2 | 12/2007 | Baerlocher et al. |
| 7,314,409 | B2 | 1/2008 | Maya et al. |
| 7,318,773 | B2 | 1/2008 | Baerlocher et al. |
| 7,331,862 | B2 | 2/2008 | Rodgers et al. |
| 7,331,866 | B2 | 2/2008 | Rodgers et al. |
| 7,335,102 | B2 | 2/2008 | Baerlocher et al. |
| 7,338,367 | B2 | 3/2008 | Kaminkow et al. |
| 7,357,713 | B2 | 4/2008 | Marks et al. |
| 7,371,168 | B2 | 5/2008 | Bilyeu et al. |
| 7,371,169 | B2 | 5/2008 | Baerlocher |
| 7,371,170 | B2 | 5/2008 | Cregan et al. |
| 7,396,279 | B2 | 7/2008 | Berman et al. |
| 7,399,225 | B2 | 7/2008 | Kaminkow |
| 7,402,102 | B2 | 7/2008 | Marks et al. |
| 7,419,431 | B2 | 9/2008 | Gauselmann et al. |
| 7,442,123 | B2 | 10/2008 | Brill et al. |
| 2002/0002078 | A1 | 1/2002 | Jaffe |
| 2002/0010017 | A1 | 1/2002 | Bennett |
| 2002/0052233 | A1 | 5/2002 | Gauselmann |
| 2002/0068623 | A1 | 6/2002 | Gauselmann |
| 2002/0077165 | A1 | 6/2002 | Bansemer et al. |
| 2002/0160836 | A1 | 10/2002 | Watanabe et al. |
| 2003/0013518 | A1 | 1/2003 | Graham |
| 2003/0022712 | A1 | 1/2003 | Locke |
| 2003/0045345 | A1 | 3/2003 | Bermin |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0092480 | A1 | 5/2003 | White et al. |
| 2003/0100356 | A1 | 5/2003 | Brown et al. |
| 2003/0125100 | A1 | 7/2003 | Cannon |
| 2003/0153382 | A1 | 8/2003 | Vancura |
| 2003/0157981 | A1 | 8/2003 | Marks et al. |
| 2003/0203752 | A1 | 10/2003 | Kaminkow et al. |
| 2003/0203753 | A1 | 10/2003 | Muir et al. |
| 2003/0207710 | A1 | 11/2003 | Rodgers et al. |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0033827 | A1 | 2/2004 | Gilmore et al. |
| 2004/0033829 | A1 | 2/2004 | Pacey et al. |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0048646 | A1 | 3/2004 | Visocnik |
| 2004/0048650 | A1 | 3/2004 | Mierau et al. |
| 2004/0048651 | A1 | 3/2004 | Vorias et al. |
| 2004/0053669 | A1 | 3/2004 | Gerrard et al. |
| 2004/0053672 | A1 | 3/2004 | Baerlocher |
| 2004/0053676 | A1 | 3/2004 | Rodgers |
| 2004/0053677 | A1 | 3/2004 | Hughs-Baird |
| 2004/0067790 | A1 | 4/2004 | Petersoon et al. |
| 2004/0072612 | A1 | 4/2004 | Rodgers et al. |
| 2004/0092302 | A1 | 5/2004 | Gauselmann |
| 2004/0097280 | A1 | 5/2004 | Gauselmann |
| 2004/0102236 | A1 | 5/2004 | Suda et al. |
| 2004/0137981 | A1 | 7/2004 | Gauselmann et al. |
| 2004/0137982 | A1 | 7/2004 | Cuddy et al. |
| 2004/0147306 | A1 | 7/2004 | Randall et al. |
| 2004/0242313 | A1 | 12/2004 | Munoz |
| 2005/0020344 | A1 | 1/2005 | Kaminkow |
| 2005/0049035 | A1 | 3/2005 | Baerlocher et al. |
| 2005/0054405 | A1 | 3/2005 | Baerlocher et al. |
| 2005/0054418 | A1 | 3/2005 | Baerlocher |
| 2005/0054429 | A1 | 3/2005 | Baerlocher et al. |
| 2005/0059446 | A1 | 3/2005 | Kaminkow |
| 2005/0059474 | A1 | 3/2005 | O'Halloran |
| 2005/0059477 | A1 | 3/2005 | Baerlocher |

(56) References Cited

U.S. PATENT DOCUMENTS

| | | | |
|---|---|---|---|
| 2005/0059478 | A1 | 3/2005 | Peterson et al. |
| 2005/0064924 | A1 | 3/2005 | Glavich et al. |
| 2005/0070354 | A1 | 3/2005 | Baerlocher et al. |
| 2005/0071023 | A1 | 3/2005 | Gilliland et al. |
| 2005/0096121 | A1 | 5/2005 | Gilliland et al. |
| 2005/0101372 | A1 | 5/2005 | Mierau et al. |
| 2005/0101380 | A1 | 5/2005 | Glavich et al. |
| 2005/0119403 | A1 | 6/2005 | St. Clair |
| 2005/0148381 | A1 | 7/2005 | Marks et al. |
| 2005/0148384 | A1 | 7/2005 | Marks et al. |
| 2005/0164774 | A1 | 7/2005 | Gauselmann |
| 2005/0187004 | A1 | 8/2005 | Vancura |
| 2005/0192081 | A1 | 9/2005 | Marks et al. |
| 2005/0208994 | A1 | 9/2005 | Berman |
| 2005/0227754 | A1 | 10/2005 | Kaminkow et al. |
| 2005/0282620 | A1 | 12/2005 | Marks et al. |
| 2005/0288094 | A1 | 12/2005 | Marks et al. |
| 2006/0019738 | A1 | 1/2006 | Baerlocher et al. |
| 2006/0030387 | A1 | 2/2006 | Jackson |
| 2006/0030392 | A1 | 2/2006 | Rodgers et al. |
| 2006/0040728 | A1 | 2/2006 | Fuller |
| 2006/0046830 | A1 | 3/2006 | Webb |
| 2006/0058095 | A1 | 3/2006 | Berman et al. |
| 2006/0058097 | A1 | 3/2006 | Berman et al. |
| 2006/0063584 | A1 | 3/2006 | Brill et al. |
| 2006/0068875 | A1 | 3/2006 | Cregan et al. |
| 2006/0068882 | A1 | 3/2006 | Baerlocher et al. |
| 2006/0068883 | A1 | 3/2006 | Randall et al. |
| 2006/0068884 | A1 | 3/2006 | Baerlocher et al. |
| 2006/0068885 | A1 | 3/2006 | Cregan et al. |
| 2006/0073872 | A1 | 4/2006 | B-jensen et al. |
| 2006/0073876 | A1 | 4/2006 | Cuddy |
| 2006/0073879 | A1 | 4/2006 | Baerlocher |
| 2006/0084492 | A1 | 4/2006 | Baerlocher et al. |
| 2006/0084493 | A1 | 4/2006 | Pederson et al. |
| 2006/0084494 | A1 | 4/2006 | Belger et al. |
| 2006/0084498 | A1 | 4/2006 | Baerlocher et al. |
| 2006/0089191 | A1 | 4/2006 | Singer et al. |
| 2006/0111174 | A1 | 5/2006 | Baerlocher et al. |
| 2006/0116195 | A1 | 6/2006 | Baerlocher et al. |
| 2006/0135247 | A1 | 6/2006 | Baerlocher et al. |
| 2006/0172795 | A1 | 8/2006 | Bussick et al. |
| 2006/0172796 | A1 | 8/2006 | Vancura |
| 2006/0199636 | A1 | 9/2006 | Ching et al. |
| 2006/0199637 | A1 | 9/2006 | Ching et al. |
| 2006/0217189 | A1 | 9/2006 | Walker et al. |
| 2006/0264254 | A1 | 11/2006 | Aoki |
| 2007/0004489 | A1 | 1/2007 | Rodgers et al. |
| 2007/0010316 | A1 | 1/2007 | Baerlocher et al. |
| 2007/0021175 | A1 | 1/2007 | Rodgers et al. |
| 2007/0021187 | A1 | 1/2007 | Gauselmann |
| 2007/0021188 | A1 | 1/2007 | Rodgers et al. |
| 2007/0026923 | A1 | 2/2007 | Muir |
| 2007/0060246 | A1 | 3/2007 | Baerlocher et al. |
| 2007/0060248 | A1 | 3/2007 | Rodgers et al. |
| 2007/0060255 | A1 | 3/2007 | Rodgers et al. |
| 2007/0060294 | A1 | 3/2007 | Cuddy et al. |
| 2007/0087812 | A1 | 4/2007 | Glavich et al. |
| 2007/0232382 | A1 | 10/2007 | Berman |
| 2007/0232383 | A1 | 10/2007 | Berman |
| 2007/0287523 | A1 | 12/2007 | Esses et al. |
| 2008/0045322 | A1 | 2/2008 | Berman |
| 2008/0045323 | A1 | 2/2008 | Berman |
| 2008/0051174 | A1 | 2/2008 | Fiden |
| 2008/0064485 | A1 | 3/2008 | Tedsen et al. |
| 2008/0090655 | A1 | 4/2008 | Marks et al. |
| 2008/0102931 | A1 | 5/2008 | Marks |
| 2008/0108411 | A1 | 5/2008 | Jensen et al. |
| 2008/0113735 | A1 | 5/2008 | Maya |
| 2008/0113765 | A1 | 5/2008 | DeWaal |
| 2008/0132320 | A1 | 6/2008 | Rodgers |
| 2008/0139298 | A1 | 6/2008 | Rodgers |
| 2008/0161097 | A1 | 7/2008 | Rodgers et al. |
| 2008/0176620 | A1 | 7/2008 | Berman et al. |
| 2008/0176634 | A1 | 7/2008 | Berman et al. |
| 2008/0200232 | A1 | 8/2008 | Baerlocher et al. |
| 2008/0207305 | A1 | 8/2008 | Cregan et al. |
| 2008/0214283 | A1 | 9/2008 | Cregan et al. |
| 2008/0227541 | A1 | 9/2008 | Berman et al. |
| 2008/0287178 | A1 | 11/2008 | Berman et al. |
| 2008/0287179 | A1 | 11/2008 | Berman et al. |

FOREIGN PATENT DOCUMENTS

| | | | |
|---|---|---|---|
| AU | 199917318 | A1 | 9/1999 |
| AU | 755879 | | 2/2001 |
| EP | 0 058 488 | | 8/1982 |
| EP | 0 060 019 | | 9/1982 |
| EP | 0 874 337 | | 10/1998 |
| EP | 0 981 119 | | 2/2000 |
| EP | 0 984 408 | | 3/2000 |
| EP | 1 063 622 | | 12/2000 |
| EP | 1 184 822 | | 3/2002 |
| EP | 1 205 894 | | 5/2002 |
| EP | 1 422 673 | | 5/2004 |
| EP | 1 513 117 | | 3/2005 |
| GB | 1 454 046 | | 10/1976 |
| GB | 2 062 922 | | 5/1981 |
| GB | 2 106 293 | | 9/1981 |
| GB | 2 081 952 | | 2/1982 |
| GB | 2 090 690 | | 7/1982 |
| GB | 2 096 376 | | 10/1982 |
| GB | 2 097 160 | | 10/1982 |
| GB | 2 100 905 | | 1/1983 |
| GB | 2 105 891 | | 3/1983 |
| GB | 2 106 295 | | 4/1983 |
| GB | 2 113 881 | | 8/1983 |
| GB | 2 117 155 | | 10/1983 |
| GB | 2 137 392 | | 10/1984 |
| GB | 2 161 008 | | 1/1986 |
| GB | 2 165 385 | | 4/1986 |
| GB | 2 170 636 | | 8/1986 |
| GB | 2 180 087 | A | 3/1987 |
| GB | 2 181 589 | | 4/1987 |
| GB | 2 183 882 | | 6/1987 |
| GB | 2 191 030 | | 12/1987 |
| GB | 2 222 712 | | 3/1990 |
| GB | 2 225 889 | | 6/1990 |
| GB | 2 226 436 | | 6/1990 |
| GB | 2 242 300 | | 9/1991 |
| GB | 2 243 236 | | 10/1991 |
| GB | 2 262 642 | | 6/1993 |
| GB | 2 322 217 | A | 8/1998 |
| GB | 2 335 524 | A | 9/1999 |
| GB | 2 372 132 | | 2/2001 |
| GB | 2 372 617 | | 8/2002 |
| GB | 2 393 555 | A | 3/2004 |
| WO | WO 97/32285 | | 9/1997 |
| WO | WO 98/20949 | | 5/1998 |
| WO | WO 00/30727 | | 6/2000 |
| WO | WO 00/32286 | | 6/2000 |
| WO | WO 00/66235 | | 11/2000 |
| WO | WO 00/76606 | | 12/2000 |
| WO | WO 01/26019 | | 4/2001 |
| WO | WO 03/026759 | | 4/2003 |
| WO | WO 2004/025584 | | 3/2004 |
| WO | WO 2005/028043 | | 3/2005 |
| WO | WO 2006/076294 | | 7/2006 |
| WO | WO 2007/002935 | | 1/2007 |
| WO | WO 2007/053349 | | 5/2007 |
| WO | WO 2007/084766 | | 7/2007 |
| WO | WO 2007/130443 | | 11/2007 |
| WO | WO 2007/130444 | | 11/2007 |

OTHER PUBLICATIONS

Brokopp, John, "A Study in Slot Machine Research and Development," published at www.casinocitytimes.com on Nov. 30, 2005.

All That Glitters website, written by WMS Gaming, published on or before Nov. 2007.

"Barn Yard by Aristocrat," article written by Strictly Slots, published Mar. 2002.

Bejeweled Web site, written by PopCap Games, http://www.popcap.com, published prior to Sep. 9, 2005.

(56) References Cited

OTHER PUBLICATIONS

Black Swan Paytable Display, written by IGT, published prior to 2001.
Break the Spell Advertisement written by Atronic Casino Technology, Ltd., published prior to Jan. 1, 2000.
"Cash Chameleon," article written by Strictly Slots/Aristocrat Leisure Industries, PTY Ltd., published in Apr. 2001.
Catch A Wave Advertisement written by IGT, published in Dec. 2000.
Cossack Dancer Advertisement written by Olympic Video Gaming, published prior to 2002.
"Expanding Symbol," Description, written by IGT, published Sep. 1999.
"Gaming Machine with Animating Symbols," Description, written by IGT, published Jan. 2000.
"Symbol Feature in Australian UFO Gaming Machine," Description written by Barcrest, Ltd., published 1995.
"Traveling Symbols," Description, written by IGT, published Sep. 1999.
Double Diamond Line Advertisement written by Bally Gaming Systems, published in 2000.
Easy Street Advertisements and Articles, written by Casino Data Systems, published in 2000.
Enchanted Forest™ Gaming Description from Aristocrat, available in 1994.
Enchanted Unicorn Advertisement written by IGT, published in 2001.
"Fishin' Buddies," article published in Strictly Slots/Anchor Games, published in Apr. 2001.
"Ghoulish Gamble," article written by Strictly Slots/IGT, published Sep. 2000.
Gold Fever Advertisement, written by Atronic Casino Technology, Ltd., published 1999.
Gold Fever by Atronic, Web Site, written by Atronic Casino Technology, published Mar. 2002.
"Gooooaal!" written by Bally Gaming, Inc., published Dec. 2000.
"It's A Blast," written by IGT, published on or before December of 2004.
Jewel in the Crown Advertisements, written by Barcrest Ltd., published 1999.
Joker's Wild Advertisement written by IGT, published prior to 2001.
"Juicy Loot" by Bally Technologies, article from Strictly Slots, published Feb. 2008.
Kaboom game Web Site, including relevant portions of multiple web pages, written by WMS Gaming, http://www.wmsgaming.com/products/video/kaboom/index.php, published prior to Sep. 9, 2005.
Kaboom game website, written by WMS Gaming, published on or before Nov. 2007.
Loco Loot Article written by Strictly Slots/Aristocrat Leisure Industries, PTY Ltd., published in May 2002.
Fey, Marshall, "Slot Machines," published by Reno-Tahoe Specialty, Inc., pp. 1-34, 1989.
"Mountain Money," article written by Strictly Slots/Aristocrat Leisure Industries, PTY Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
Penguin Pays Article written by Strictly Slots/Aristocrat Leisure Industries published in Apr. 1999.
"Reel Magic™ Gaming Machine," Description written by IGT, available in 1986.
South Park Advertisement, written by IGT, published Sep. 1999.
Wolf Run Video Slots Advertisement, written by IGT, published prior in 2006.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, available prior to Jun. 2007.

GAMING SYSTEM, GAMING DEVICE, AND METHOD FOR PROVIDING A CASCADING SYMBOLS GAME HAVING MAGNETIC SYMBOLS AND TARGET SYMBOLS

PRIORITY CLAIM

This application is a continuation of, claims priority to and the benefit of U.S. patent application Ser. No. 12/270,553, filed on Nov. 13, 2008, the entire contents of which is incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur provide higher awards. In such known gaming machines, the amount of the wager made on the base game by the player can vary.

Gaming machines which provide cascading symbol games are also known. In one such cascading symbol game, a gaming machine generates and displays a plurality of symbols in a plurality of symbol positions. The gaming machine evaluates the displayed symbols and provides an award for each winning symbol combination formed. The gaming machine then removes the displayed symbols that form the winning combination(s) of symbols to create one or more empty symbol positions. The gaming machine shifts zero, one, or more of the remaining displayed symbols downward into zero, one, or more of the empty symbol positions. If any empty symbol positions remain, the gaming machine generates and displays a symbol for each empty symbol position. The gaming machine reevaluates the displayed symbols and provides an award for any winning symbol combinations formed. The gaming machine repeats the steps of removing generated symbols, shifting generated symbols, generating new symbols if winning symbol combinations continue to be formed, and evaluating generated symbols.

There is a continuing need to increase this excitement and entertainment for people playing gaming machines. There is also need for new ways of providing better gaming experiences and environments at gaming machines. There is a further need for increasing the number of winning symbol combinations generated and awards provided to a player for a single wager on a play of a game.

SUMMARY

The present disclosure relates generally to gaming systems, gaming devices, and methods for providing a cascading symbol game including target symbols and magnetic symbols and for shifting certain magnetic symbols toward certain target symbols during the play of the game. More particularly, the present disclosure relates to a gaming system which enables a player to wager on plays of a game (implemented as either a primary game or a secondary game) having a plurality of symbol positions. For a play of the game, the gaming system generates and displays one of a plurality of symbols in each of the symbol positions. The plurality of symbols includes at least one target symbol and at least one magnetic symbol. In various embodiments, a target symbol is a symbol which establishes a direction for shifting symbols and a magnetic symbol is a symbol which has the ability to shift based on the direction established by a target symbol. The gaming system thereafter determines whether any magnetic symbol is generated in a designated spatial relationship with any target symbol. If a magnetic symbol is generated in such a designated spatial relationship with a target symbol, the gaming system shifts such that magnetic symbol toward the spatially related target symbol, replacing the symbol previously displayed in the shifted-to symbol position and resulting in an empty symbol position. After shifting, the gaming system fills the empty symbol position by either shifting one or more generated symbols into corresponding empty symbol positions or by generating and displaying one or more of the plurality of symbols in the empty symbol positions. The gaming system again determines whether any magnetic symbols are generated in the designated spatial relationship with any target symbols and, if so, repeats the described shifting and generation until no unshifted magnetic symbol is displayed as spatially related to a target symbol. The gaming system provides an award for any displayed winning symbol combinations generated during the play of the game.

In one embodiment, the disclosed gaming system displays a plurality of symbol positions as a matrix of symbol positions. In this embodiment, the matrix of symbol positions includes a plurality of columns of symbol positions and a plurality of rows of symbol positions. In one embodiment, the gaming system generates and displays one of a plurality of symbols in each symbol position. In one such embodiment, at least one of the plurality of symbols is a target symbol and at least one of the plurality of symbols is a magnetic symbol.

In one embodiment, the gaming system enables the player to wager on a play of the game. In this embodiment, the gaming system generates and displays one of the plurality of symbols in each of the symbol positions for the play of the game. It should be appreciated that the gaming system may generate zero, one, or more target symbols and zero, one, or more magnetic symbols for any play of the game. In one embodiment, the gaming system determines whether any target symbols were generated in a designated spatial relationship with any magnetic symbols. In one embodiment, a magnetic symbol is in the designated spatial relationship with the target symbol if the magnetic symbol and the target symbol are displayed in a same row of a matrix of symbol positions. In another embodiment, a magnetic symbol is spatially related to a target symbol if the symbols are generated in symbol positions of a same paylines. In one embodiment, if no generated target symbols are spatially related to any generated magnetic symbol, the gaming system provides an award for any generated winning symbol combination. In one embodiment, the gaming system disclosed herein also determines whether the displayed symbols form any winning symbol combinations and provides an award for any such winning symbol combinations.

In one embodiment, if the gaming system determines that a magnetic symbol was generated in the designated spatial relationship with a target symbol, the gaming system shifts the displayed magnetic symbol toward the spatially related target symbol until the magnetic symbol is in a symbol position adjacent to either (a) the target symbol or (b) a symbol previously shifted toward the target symbol. In one embodiment, the gaming system displays the shifted magnetic symbol as replacing the symbol previously displayed in the shifted-to symbol position.

In one embodiment, the shifting of one or more magnetic symbols during the play of the game results in one or more empty symbol positions. In one such embodiment, the gaming system fills at least one of the empty symbol positions by shifting at least one generated, non-shifted symbol displayed in a symbol position adjacent to an empty symbol position into that empty symbol position. In one embodiment, after shifting any appropriate symbols as described, the gaming system generates and displays one of the plurality of symbols in the empty symbol position created by such shifting. Such a generation and display represents an opportunity to generate additional magnetic symbols and/or additional target symbols for the play of the game.

After shifting, the gaming system determines whether the currently displayed symbols in the plurality of symbol positions include any magnetic symbol which is displayed in the designated spatial relationship with a target symbol. If such spatially related magnetic and target symbols are displayed, the gaming system repeats the above-described shifting of the appropriate magnetic symbol and shifting and generation of appropriate non-magnetic, non-target symbols until no unshifted magnetic symbols are displayed in the designated spatial relationship with one of the target symbols.

In one embodiment, after determining that no displayed magnetic symbol is displayed in the designated spatial relationship with any displayed target symbol, the gaming system determines whether any winning symbol combinations are displayed and provides any appropriate award. In one embodiment, the gaming system analyzes any shifted magnetic symbols as designated symbols, such as wild symbols, for purposes of determining whether a winning symbol combination is displayed.

In one embodiment, after providing any appropriate award, for any winning symbol combinations generated (including winning symbol combinations generated if no magnetic symbol was generated in the designated spatial relationship with a target symbol), the gaming system removes at least one symbol from at least one winning symbol combination. In this embodiment, the gaming system fills any empty symbol positions created by such removal by either shifting one of the remaining symbols to the empty symbol position or by generating and displaying one of the plurality of symbols in the empty symbol position. In this embodiment, after generating and displaying a symbol in each symbol position, the gaming system repeats the described process until no winning symbol combination is displayed.

The gaming system and method of the present disclosure thus provide a game having increased volatility due to the shifting of magnetic symbols toward target symbols. Specifically, the gaming system provides a player with an opportunity to win multiple awards for a single play of the game based on the shifting and transformation of magnetic symbols toward target symbols generated during a play of the game. The gaming system and method of the present disclosure also provide a cascading symbols game wherein one or more magnetic symbols replaces one or more non-magnetic symbols during the play of the game, resulting in an empty symbol position.

Additional features and advantages are described in, and will be apparent from, the following Detailed Description and the figures.

BRIEF DESCRIPTION OF THE FIGURES

FIGS. 4A, 4B, 40, 4D, 4E, 4F, 4G, 4H, 4I, 4J, and 4K each illustrate a point in time during one embodiment of a play of the game of the gaming system disclosed herein.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
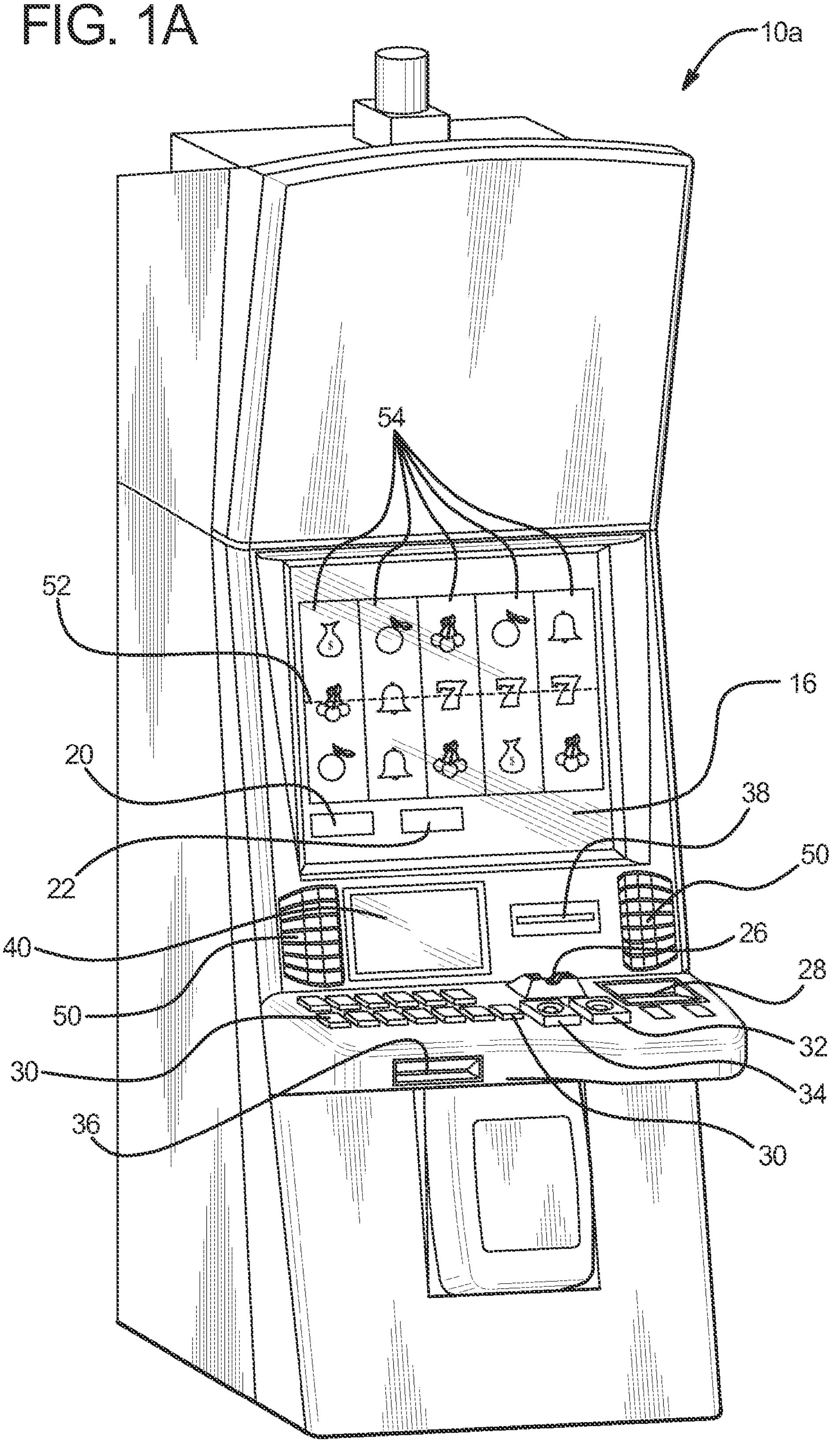
FIGS. 1A and 1B are perspective views of example alternative embodiments of the gaming device of the present disclosure.
Figure 1B:
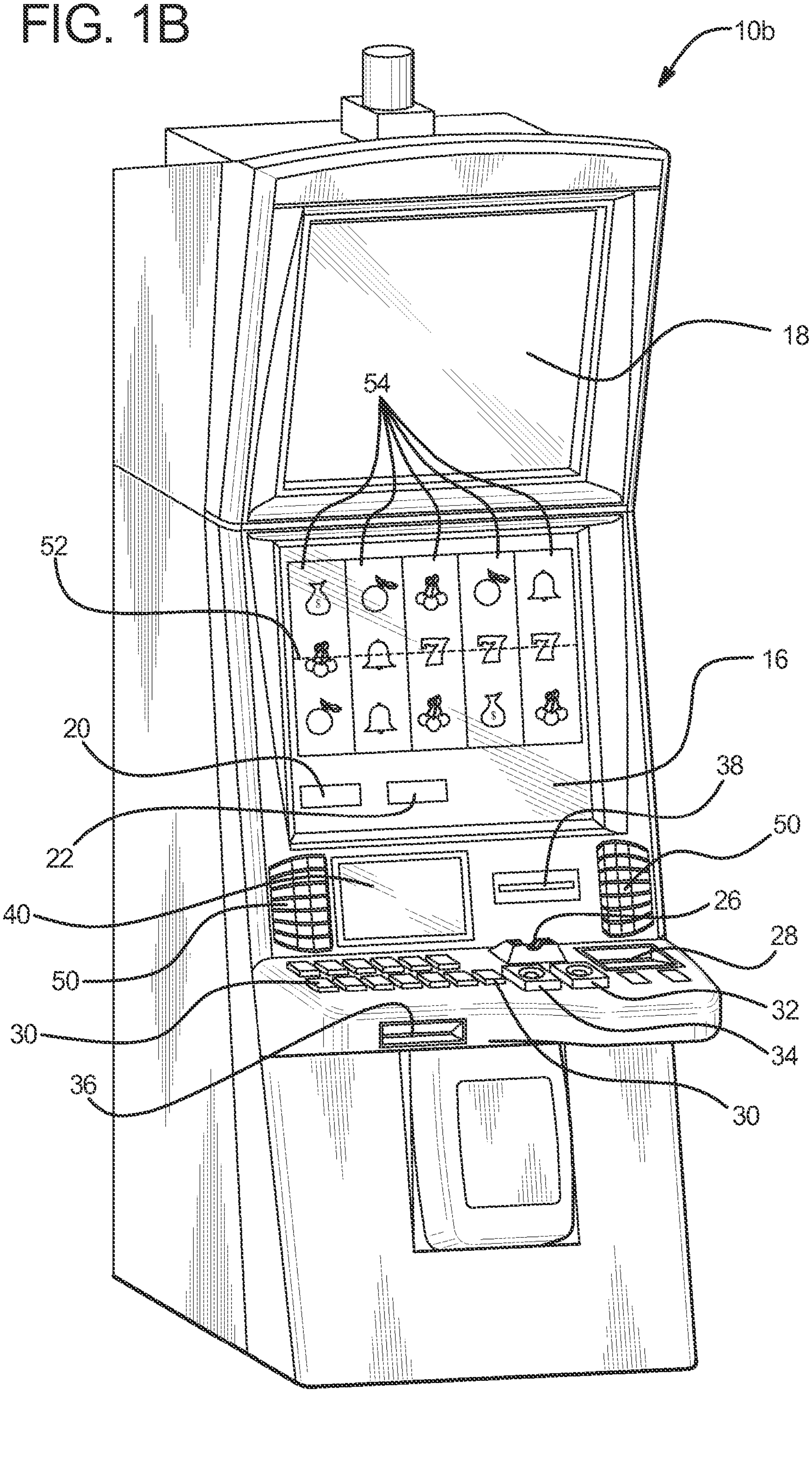

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
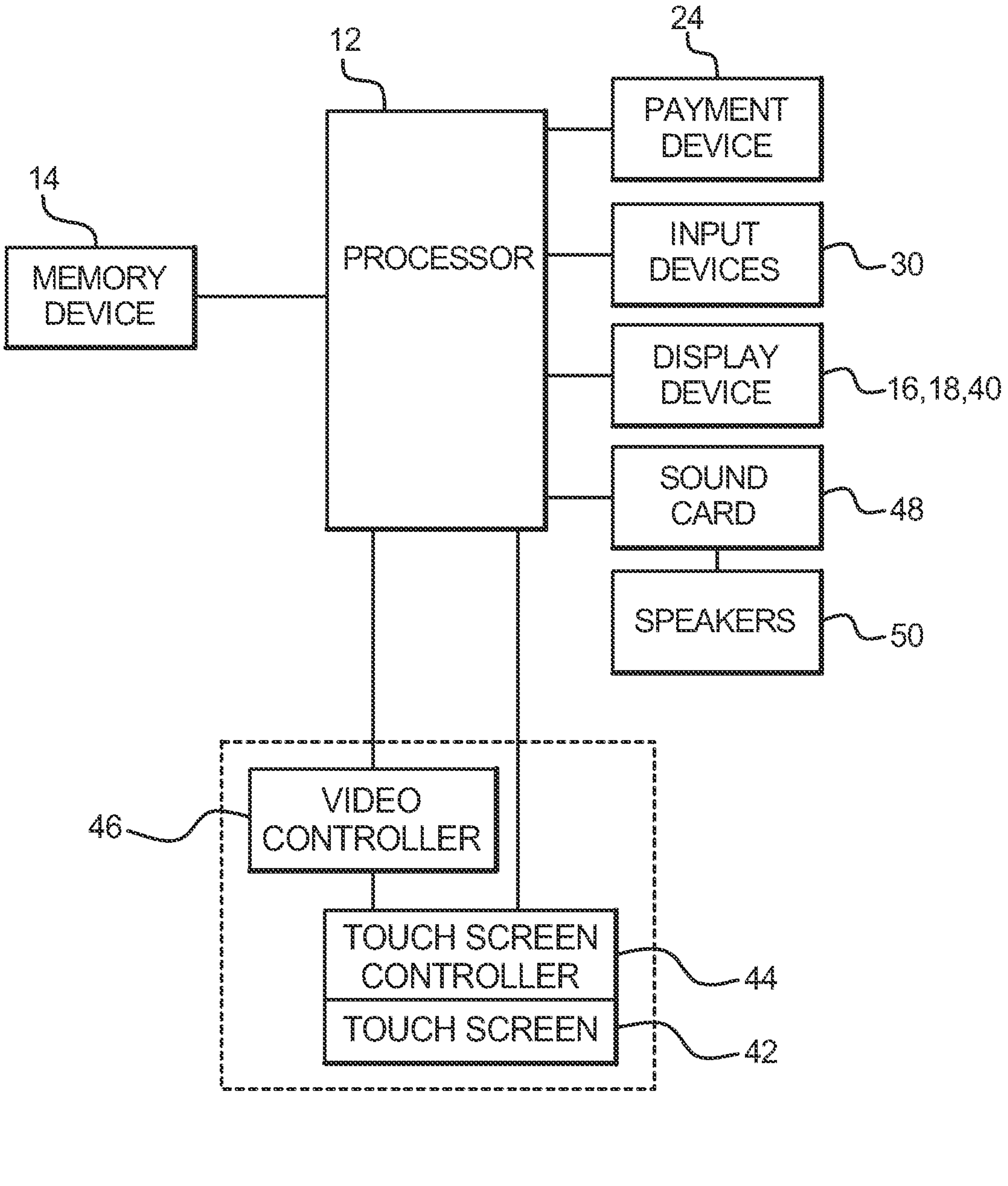
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASICs). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (FDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a “computer” or “controller.”

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player’s current number of credits, cash, account balance, or the equivalent. In one embodiment, the gaming device includes a bet display 22 which displays a player’s amount wagered. In one embodiment, as described in more detail below, the gaming device includes a player tracking display 40 which displays information regarding a player’s play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surfaceconduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the players wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
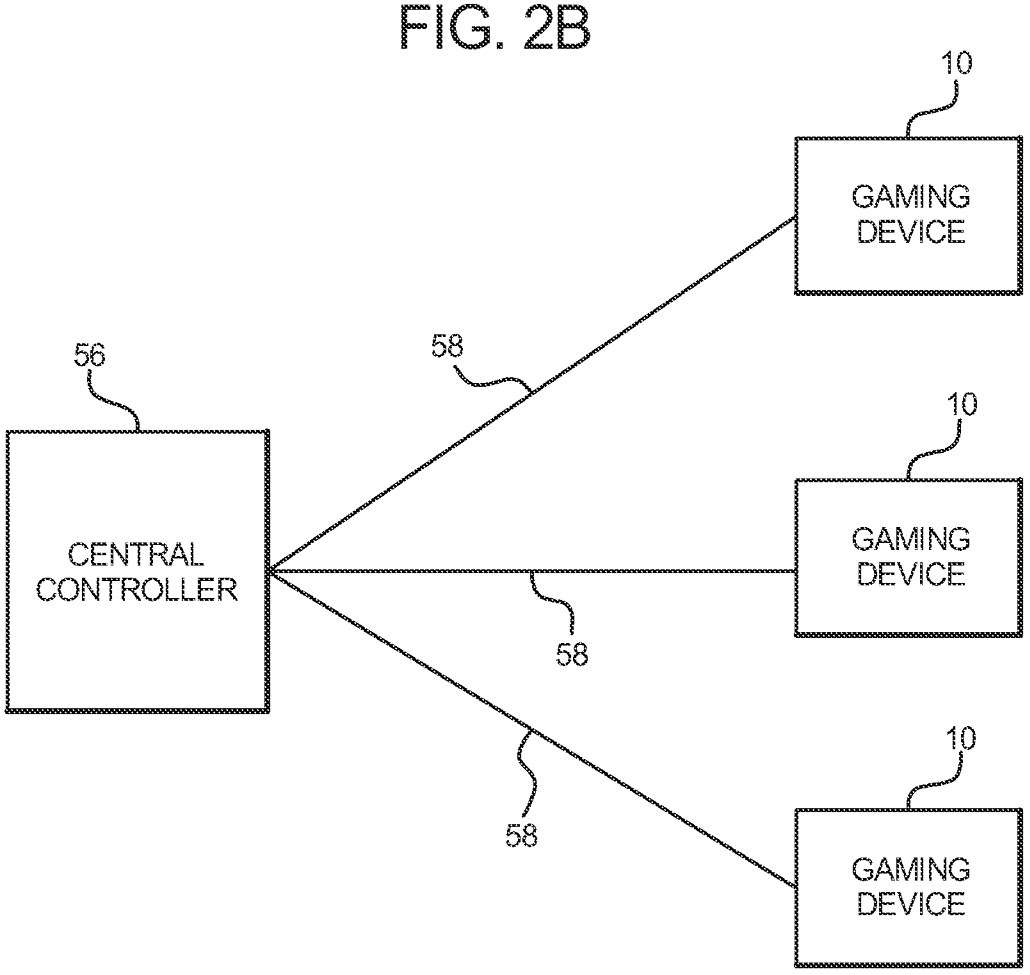
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symboldriven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Gaming System Having Target Symbols and Shifting Magnetic Symbols

In one embodiment, the gaming system disclosed herein displays a matrix of symbol positions and generates one of a plurality of symbols in each symbol position for a play of a game. In one embodiment, the plurality of symbols includes a target symbol and a magnetic symbol. In one embodiment, a target symbol is a symbol which establishes a direction for shifting, such as toward the target symbol. In one embodiment, a magnetic symbol is a symbol which has the ability to shift toward or be attracted to a target symbol. In one embodiment, the gaming system shifts a magnetic symbols toward a target symbol if the magnetic symbol is displayed in a designated spatial relationship with the target symbol. In one embodiment, the disclosed cascading symbol game including magnetic and target symbols is implemented as a base or primary game. In another embodiment, the disclosed game is implemented as a bonus or secondary game.

Figure 3:
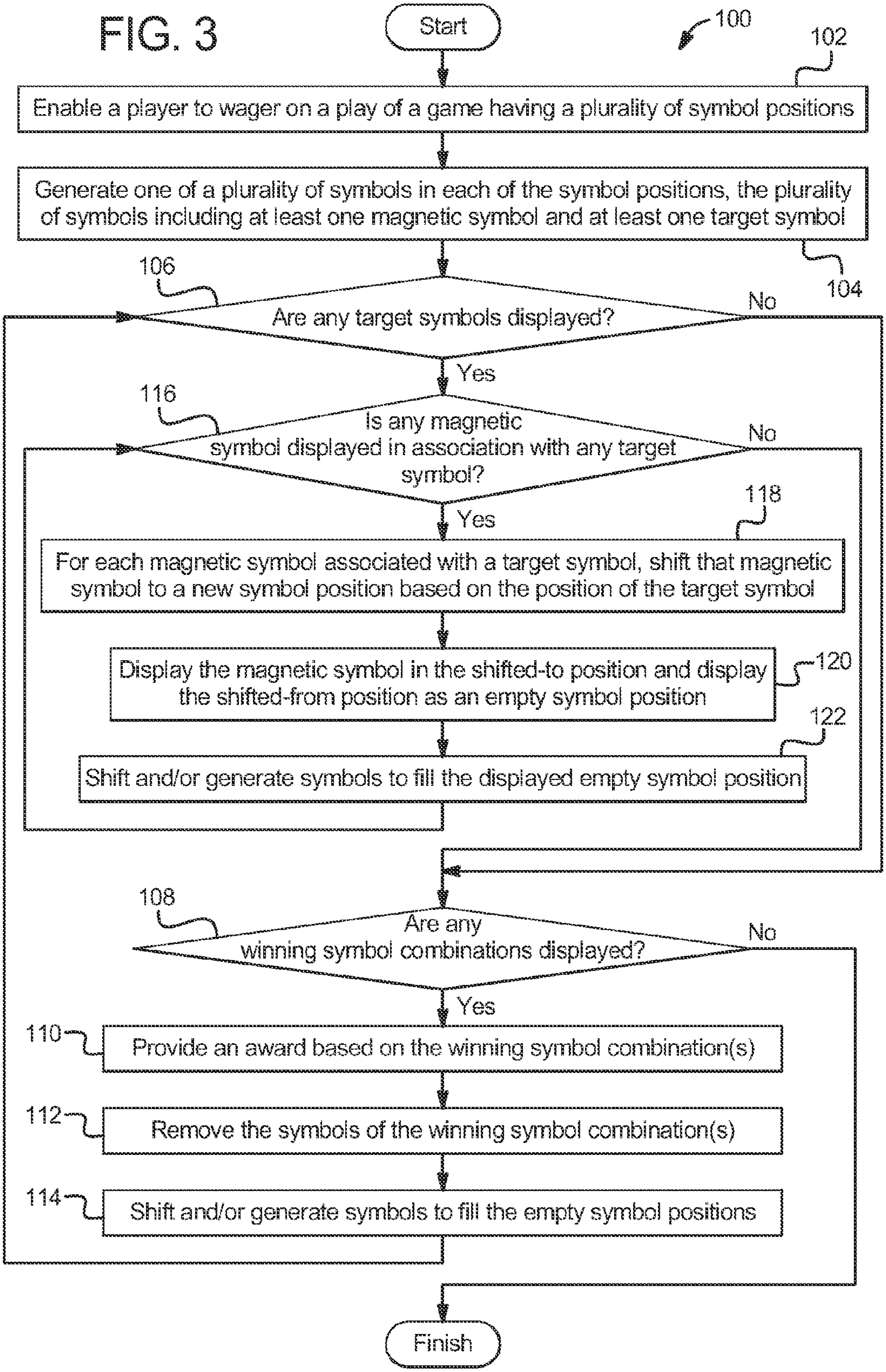
FIG. 3 is a flow chart an example process for operating a gaming system providing the game including the magnetic and target symbols disclosed herein.

FIG. 3 illustrates a flow chart of an example process 100 for operating a gaming system providing the game disclosed herein. Although the example process 100 for operating the gaming system for providing the disclosed game is described with reference to the flow chart illustrated in FIG. 3, many other methods of operating a gaming system are contemplated. For example, the order of certain of the blocks may be changed, and certain of the blocks described are optional.

In one embodiment, the disclosed gaming system enables a player to wager on a play of a game having a plurality of symbol positions, as indicated by block 102. The gaming system generates one of a plurality of symbols in each of the symbol positions, as indicated by block 104. In one embodiment, the plurality of symbols from which the symbols are generated includes at least one magnetic symbol and at least one target symbol, as further indicated by block 104. In one embodiment, the plurality of symbol positions are displayed in a matrix of symbol positions, the matrix including a plurality of columns and a plurality of rows.

In one embodiment, upon displaying one of the plurality of symbols in each symbol position, the disclosed gaming system determines whether any target symbol is displayed in any symbol position, as indicated by block 106. In one embodiment, if no target symbol is displayed in any symbol position, the gaming system determines if any winning symbol combination is displayed in the plurality of symbol positions, as indicated by block 108. If no winning symbol combination is displayed, the gaming system ends the play of the game.

In one embodiment, if any winning symbol combination is displayed, as indicated by block 108, the gaming system provides an award based on the displayed winning symbol combination(s), as indicated by block 110. In one embodiment, the gaming system removes each symbol of each of any winning symbol combinations, as indicated by block 112. In one embodiment, removing such symbols results in one or more empty symbol positions. The gaming system fills any empty symbol positions by shifting one or more displayed symbols and/or generating one or more of the plurality of symbols for each empty symbol position, as indicated by block 114. In one embodiment, after filling any empty symbol positions as described, the gaming system again determines whether a target symbol is displayed in any symbol position, as indicated by block 106. It should be appreciated that in this embodiment, the disclosed gaming system enables a play of a game to continue so long as one or more winning symbol combinations continue to be generated.

In one embodiment, if the gaming system determines that a target symbol is displayed in one of the symbol positions, as indicated by block 106, the gaming system next determines if a magnetic symbol is displayed in a designated spatial relationship with one of any displayed target symbols, as indicated by block 116. For example, the gaming system determines if a magnetic symbol is displayed in a same row as a target symbol. If no magnetic symbol is displayed in the designated spatial relationship with any target symbol, the gaming system determines whether any winning symbol combination is displayed, as indicated by block 108 and proceeds as described above based on whether such a winning symbol combination is displayed.

In one embodiment, if the gaming system determines that a magnetic symbol is displayed in the designated spatial relationship with one of any target symbols, as indicated by block 116, the gaming system shifts each such magnetic symbol to a new symbol position based on the position of the spatially related target symbol, as indicated by block 118. For example, the gaming system shifts each magnetic symbol toward a spatially related target symbol until the magnetic symbol is displayed in a symbol position adjacent to either (a) the target symbol or (b) a previously-shifted magnetic symbol. In one embodiment, the gaming system displays the magnetic symbol in the shifted-to position, as indicated by block 120, replacing the previously displayed symbol in the shifted-to position with the magnetic symbol.

In one embodiment, the disclosed gaming system shifts one or more displayed symbols and/or generates one of the plurality of symbols to fill the empty symbol position created by shifting a magnetic symbol, as indicated by block 122. In this embodiment, following any appropriate shifting and generation (i.e., after the gaming system has filled any empty symbol positions), the gaming system again determines whether any magnetic symbols are displayed in the designated spatial relationship with any of the displayed target symbols, as indicated by block 116. If so, the gaming system repeats the above-disclosed shifting of magnetic symbols indicated in blocks 118 and 120 and the disclosed shifting/generation of symbols indicated in block 122. When the gaming system determines that no further magnetic symbols are displayed in the designated spatial relationship with a target symbol, as indicated by block 116, the gaming system determines whether any winning symbol combinations are present as indicated in block 108. The gaming system then proceeds as discussed above.

In one embodiment, after shifting a magnetic symbol which is spatially related to a target symbol, the gaming system transforms the magnetic symbol into a designated symbol (such as a wild symbol) for the remainder of the play of the game. It should be appreciated that such transformation may represent an opportunity to win additional awards or awards with higher values for the play of the game. In one embodiment, the disclosed shifting and transformation is displayed to the player as a replacement of a previously generated symbol by the magnetic symbol followed by (or preceding) a transformation of the magnetic symbol into the designated symbol. In another embodiment, the gaming system does not display a transformation of the magnetic symbol into a different symbol (such as a designated symbol); rather, the gaming system analyzes the magnetic symbol as the different symbol (such as the designated symbol) while determining whether any winning symbol combinations are displayed.

In one embodiment, the disclosed gaming system is configured to provide at least one reel which includes a reel strip having plurality of target symbols in a plurality of adjacent symbol positions of the reel strip. In this embodiment, due to the plurality of adjacent target symbols of the reel strip, the reel provides a stacked symbol effect with respect to the target symbols. In this embodiment, the adjacent target symbols result in a relatively high probability that at least one of the target symbols will be generated for a play of the game. Moreover, the adjacent target symbols result in a relatively high probability that the reel including the adjacent symbols will display a plurality of target symbols for a play of the game. It should be appreciated that such a stacked symbol effect with respect to the target symbols results in a relatively high probability that if and when a magnetic symbol is generated, that generated magnetic symbol will be spatially related to at least one generated target symbol.

FIGS. 4A to 4K illustrate one embodiment of a play of the game of the gaming system disclosed herein. Specifically, each of FIGS. 4A to 4K illustrates a gaming device such as gaming device 10*a* including display 16 at a specific point in time during a play of the disclosed cascading symbol game. The gaming device uses display 16 to display a plurality of reels 54*a*, 54*b*, 54*c*, 54*d*, and 54*e*, each reel including four visible symbol positions arranged along paylines 52*a*, 52*b*, 52*c*, and 52*d*.

The gaming device 10*a* illustrated in FIGS. 4A to 4K is configured to generate a symbol for each of the plurality of symbol positions from a plurality of symbols including a magnetic symbol and a target symbol. In the illustrated embodiment, the magnetic symbol is displayed as an "M" symbol and the target symbol is displayed as a "T" symbol. Further, in the illustrated embodiment, a displayed magnetic symbol is spatially related to a displayed target symbol if the magnetic symbol and the target symbol are displayed in a same row of the symbol matrix. The gaming device 10*a* in the illustrated embodiment is configured to analyze any target symbol as a wild symbol to determine whether any winning symbol combinations are displayed. Finally, in the illustrated embodiment, the gaming device 10*a* is configured to transform any displayed magnetic symbol spatially related to a displayed target symbol into a wild symbol for purposes of determining winning symbol combinations upon shifting the magnetic symbol toward the target symbol.

Figure 4A:
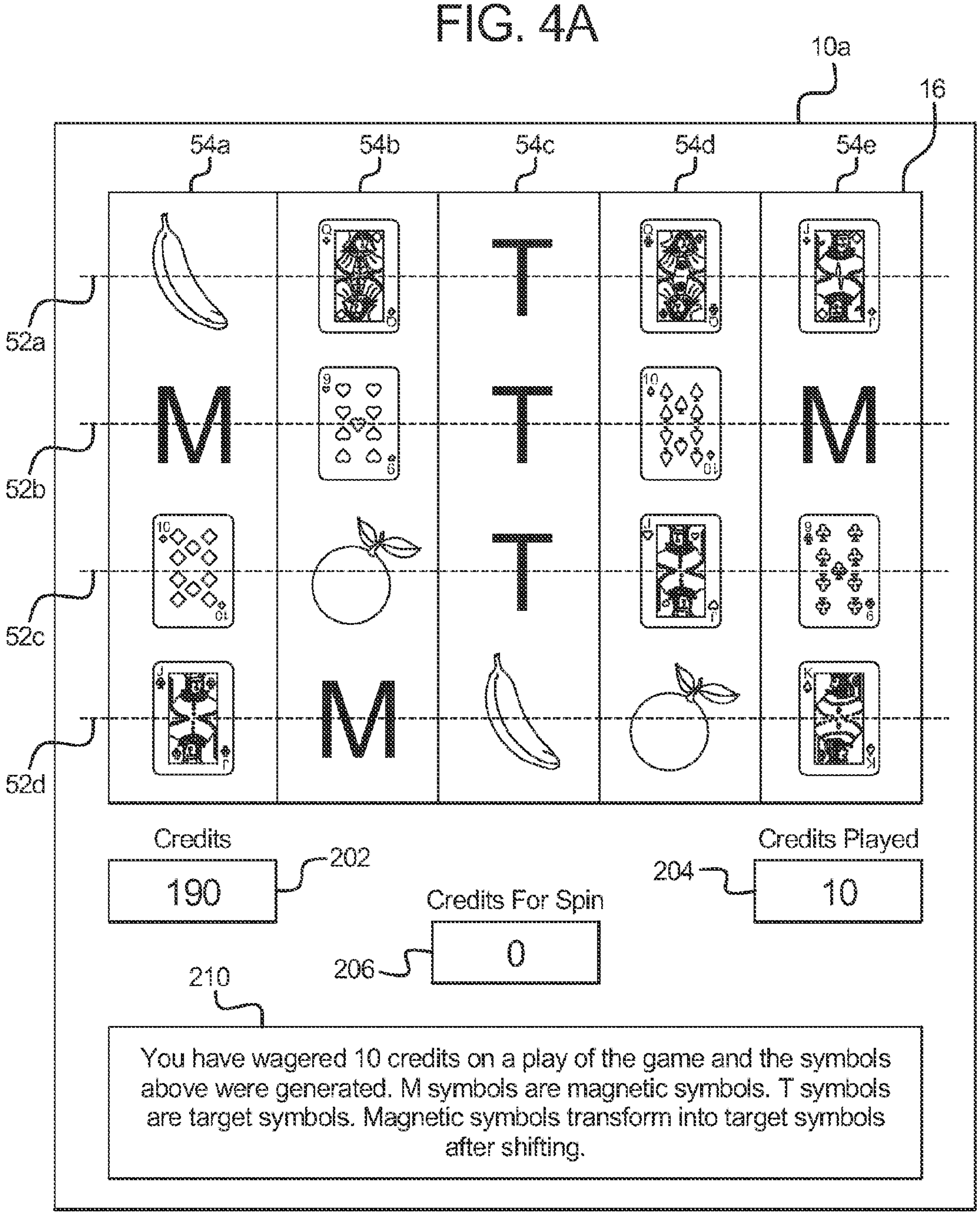

Referring now to FIG. 4A, gaming device 10*a* is illustrated at a first point in time after having generated a symbol in each of a plurality of symbol positions of reels 54*a*, 54*b*, 54*c*, 54*d*, and 54*e*. As illustrated in the credits display area 202, the player has a total of one-hundred-ninety credits to wager on future plays of the game. Since the credits played display area indicates that the player wagered ten credits on the current play of the game, it should be appreciated that the player began the play of the game (i.e., prior to wagering on the illustrated play of the game) with two-hundred credits. Game information display area 210 confirms that the player wagered ten credits on the play of the game. The game information display area 210 further indicates that any M symbols generated during the play of the game are magnetic symbols, and that any generated T symbols are target symbols. Thus, for the illustrated generation of symbols, the gaming device 10*a* displays two magnetic symbols on reels 54*a* and 54*e* at the symbol positions along payline 52*b*, and a third magnetic symbol on reel 54*b* at the symbol position on payline 52*d*. The gaming device also displays a plurality of target symbols on reel 54*c* in the symbol positions on paylines 52*a*, 52*b*, and 52*c*.

Figure 4B:
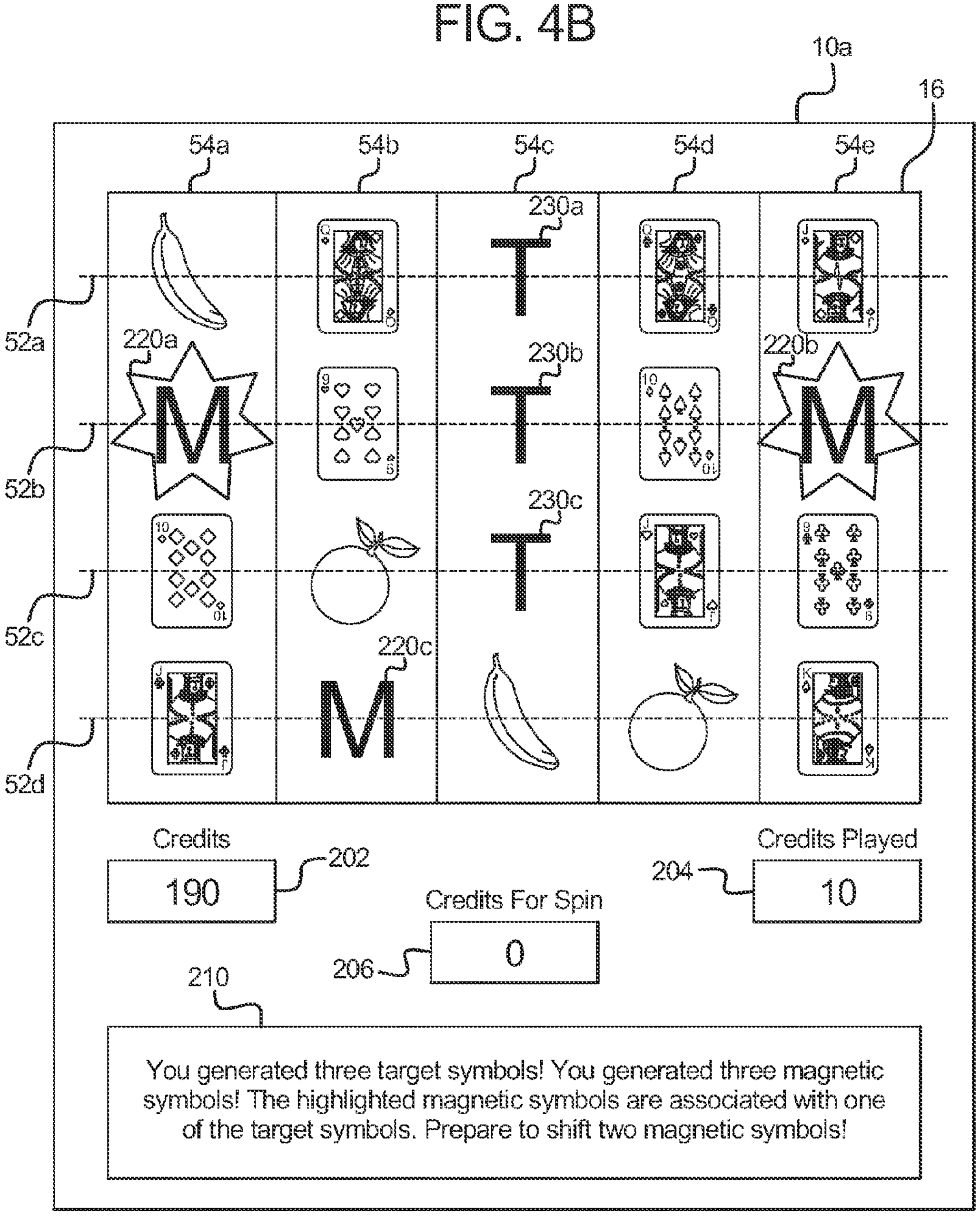

At the point in time illustrated by FIG. 4B, the gaming device 10*a* indicates any generated magnetic symbols which are spatially related to a generated target symbol. As discussed above, in this embodiment a magnetic symbol is spatially related to a target symbol if the magnetic symbol is displayed in a same row of symbols as the target symbol. In the illustrated embodiment, magnetic symbols 220*a* and 220*b* are spatially related to the target symbol 230*b* because the magnetic symbols 220*a* and 220*b* are displayed in the same row of the symbol matrix as target symbol 230*b*. Thus, the gaming device highlights spatially related magnetic symbols 220*a* and 220*b* by displaying a starburst identifier encircling the magnetic symbols 220*a* and 220*b*. The game information display area 210 indicates that the gaming device generated three magnetic symbols and three target symbols for the play of the game. The game information display area 210 further indicates that the two highlighted magnetic symbols 220*a* and 220*b* are spatially related to target symbol 230*b* because they are displayed in the same row of the symbol matrix. Since two magnetic symbols are displayed in the designated spatial relationship with a target symbol, the game information display area 210 indicates that a shift of the two magnetic symbols 220*a* and 220*b* will occur. It should be appreciated that in the illustrated embodiment, generated target symbols 230*a* and 230*c* are not spatially related to any generated magnetic symbol, and generated magnetic symbol 220*c* is not spatially related to any generated target symbol.

Figure 4C:
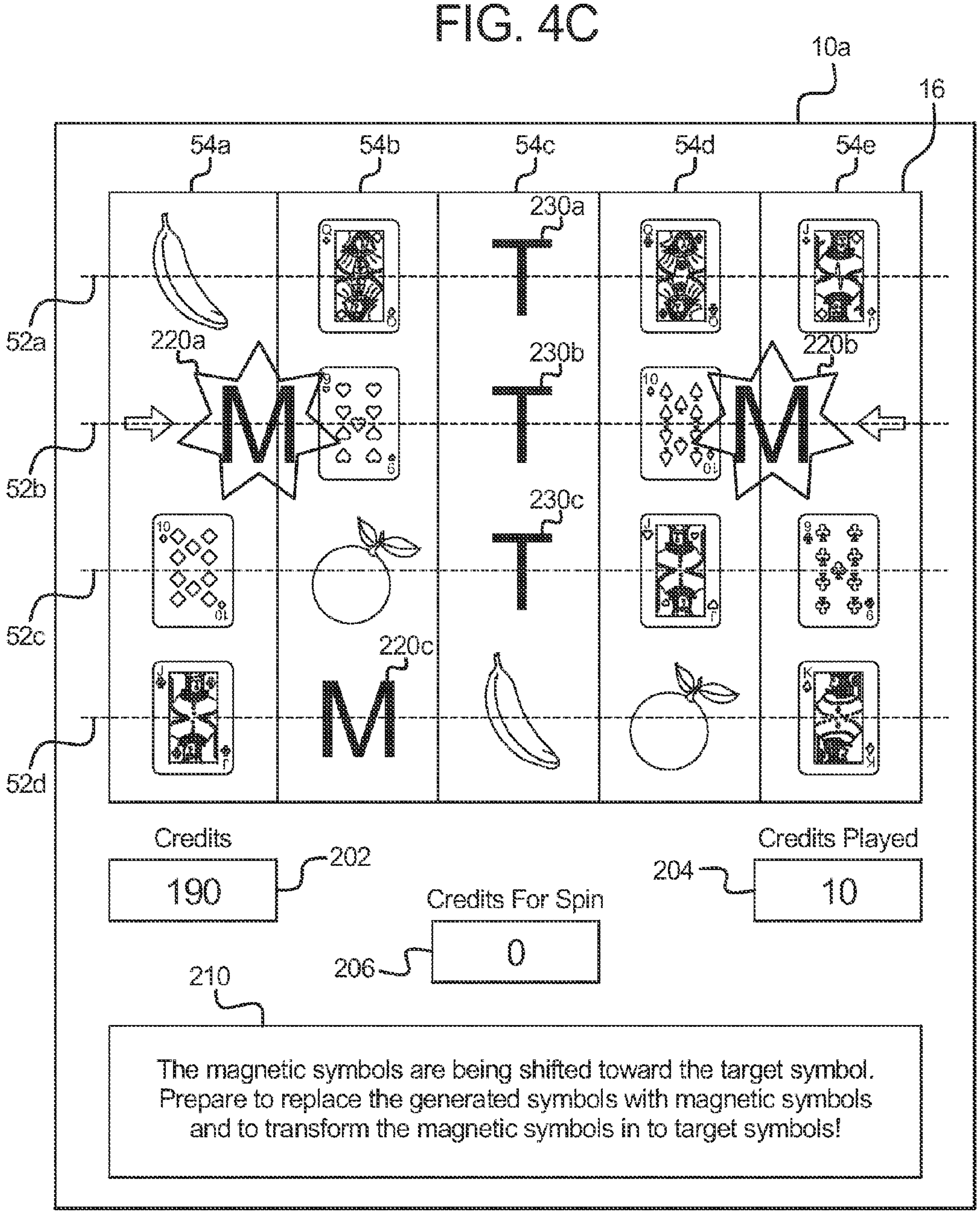

FIG. 4C illustrates the disclosed gaming device 10*a* at a point in time during the shifting of magnetic symbols 220*a* and 220*b*. Specifically, because magnetic symbols 220*a* and 220*b* are spatially related to target symbol 230*b*, the gaming device illustrates the magnetic symbols 220*a* and 220*b* as shifting toward the target symbol 230*b* along the common row of the symbol matrix. In the illustrated embodiment, the gaming device displays the symbol positions at which the spatially related magnetic symbols 220*a* and 220*b* were generated (i.e., the symbol positions along payline 52*b* on reels 54*a* and 54*e*) as empty symbol positions. The game information display area 210 indicates that such shifting is occurring, and further indicates that the shifting magnetic symbols 220*a* and 220*b* will replace symbols generated in the shifted-to positions for the play of the game. In the illustrated embodiment, the shifting magnetic symbols will replace the Nine symbol and the Ten symbol generated along payline 52*b* on reels 54*b* and 54*d* (i.e., the symbols at the shifted-to symbol positions), respectively.

Figure 4D:
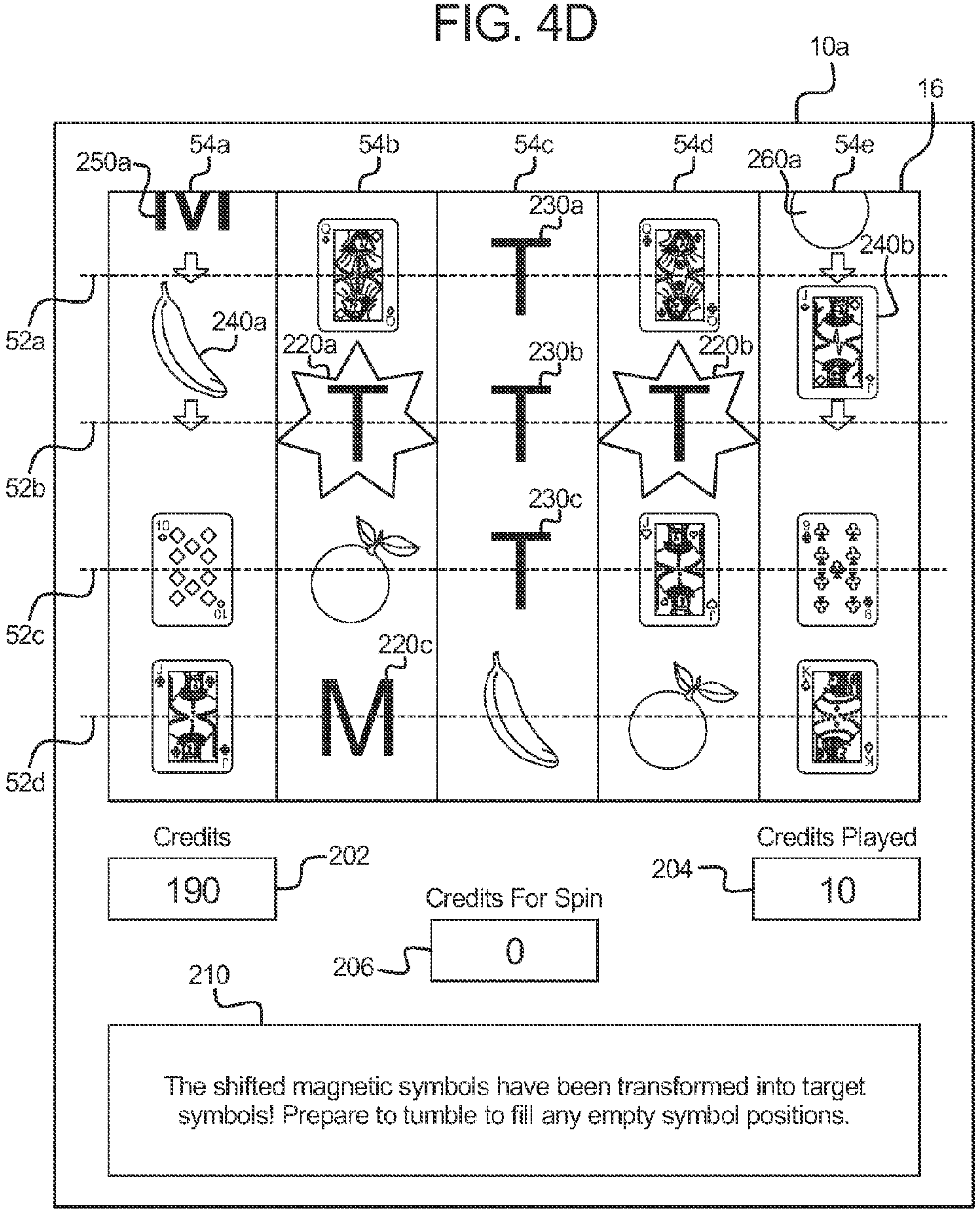

FIG. 4D illustrates gaming device 10*a* after magnetic symbols 220*a* and 220*b* have been shifted as far as possible toward target symbol 230*b* without replacing either (a) the spatially related target symbol 230*b* or (b) any other previously shifted symbol (i.e., a previously shifted magnetic symbol). In the illustrated embodiment, the shifted magnetic symbols 220*a* and 220*b* have replaced the symbols previously displayed at the shifted-to symbol positions. Moreover, in the illustrated embodiment, the gaming device has transformed the shifted magnetic symbols into target symbols. It should be appreciated that in this embodiment, since target symbols are analyzed as wild symbols, shifting any displayed magnetic symbols toward any displayed spatially related target symbols results in a plurality of adjacent symbols usable as wild symbols to form winning symbol combinations. It should be appreciated that in another embodiment, the gaming device does not transform shifted magnetic symbols into target symbols. For example, the gaming device merely treats or interprets shifted magnetic symbols as wild symbols for purposes of determining whether any winning symbol combinations are displayed.

Since two magnetic symbols were shifted (and replaced two non-magnetic symbols), the gaming device 10*a* at the point in time illustrated in FIG. 40 displays two empty symbol positions—one on reel 54*a* and one on reel 54*e*. In the illustrated embodiment, the gaming device is configured to shift one or more symbols downward as far as possible to fill any empty symbol positions created during the play of the game. Thus, in the illustrated embodiment, the disclosed gaming device shifts symbols from the top row of the symbol matrix downward into symbol positions of the second row of the symbol matrix to fill the empty symbol positions displayed thereon. In the illustrated embodiment, the gaming device shifts Banana symbol 240*a* downward into one of the empty symbol positions and Jack symbol 240*b* downward into the other empty symbol position. It should be appreciated that each such shifting in one embodiment results in an empty symbol position (i.e., the position from which the symbol was shifted).

Referring still to FIG. 4D, the gaming device fills any empty symbol positions displayed after shifting symbols 240*a* and 240*b* downward by randomly generating and displaying one of the plurality of symbols in each empty symbol position. In the illustrated embodiment, the gaming device generates magnetic symbol 250*a* and Orange symbol 260*a* to fill the empty symbol positions of reels 54*a* and 54*e*, respectively. It should be appreciated that in the illustrated embodiment, the gaming device displays these generated symbols 250*a* and 260*a* as shifting downward from outside the displayed symbol positions to display a cascading or tumbling effect to the player. Game information display area 210 of FIG. 4D indicates that the magnetic symbols have been shifted and transformed into target symbols for the play of the game, and that the gaming device is in the process of shifting and generating the appropriate symbols to fill the empty symbol positions created by the shifted, transformed magnetic symbols.

Figure 4E:
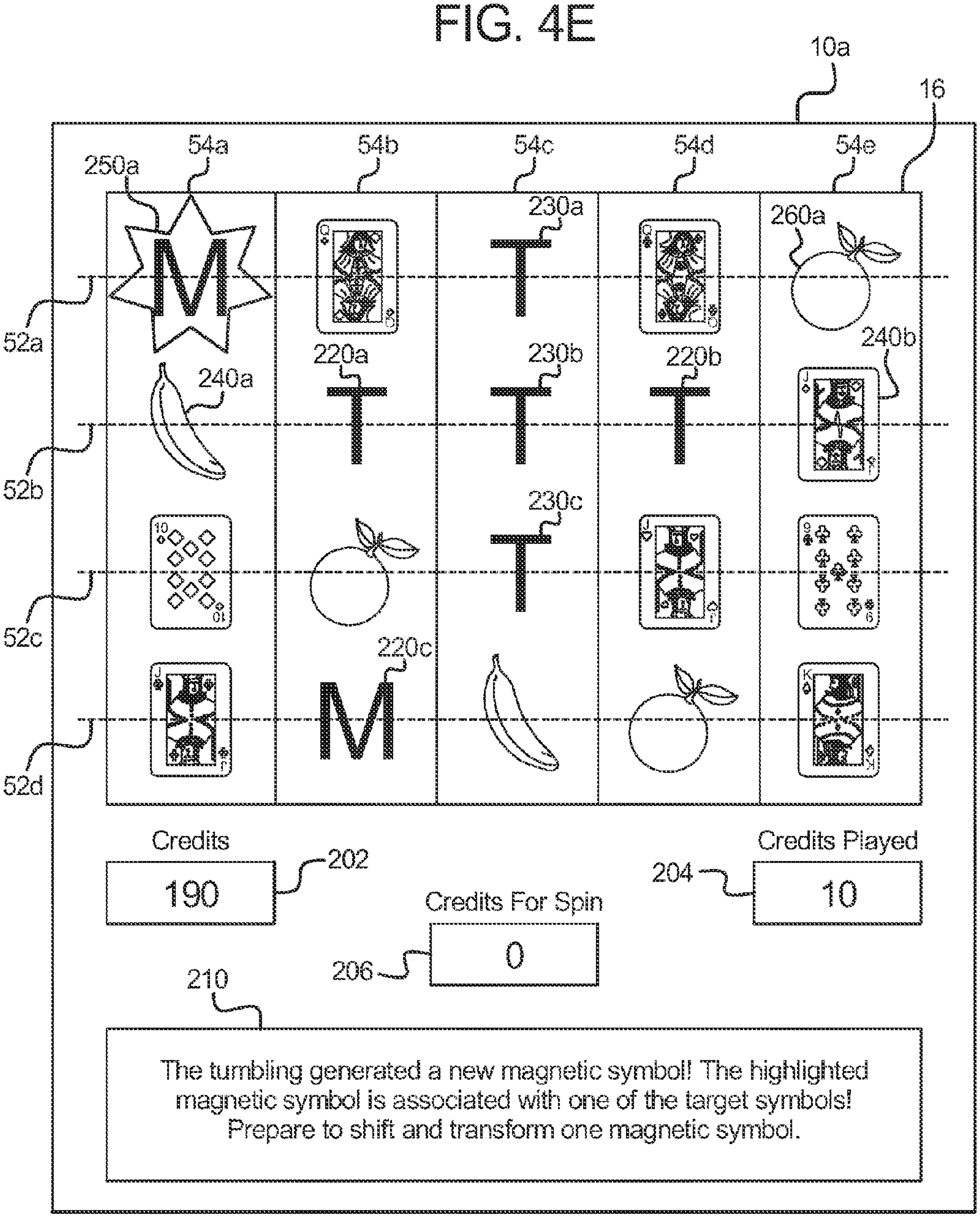

FIG. 4E illustrates the disclosed gaming device 10*a* at a point in time after the spatially related magnetic symbols have been shifted and transformed and after the appropriate additional symbols have been shifted and generated, such that each symbol position displays a symbol. In the illustrated embodiment, the gaming device determines whether any currently displayed magnetic symbols are spatially related to any currently displayed target symbols. In the illustrated embodiment, since magnetic symbols 220*a* and 220*b* have been previously transformed into target symbols, the gaming device does not determine that such symbols are spatially related magnetic symbols. In one embodiment, the gaming device determines that magnetic symbol 250*a*, which was generated from the plurality of symbols, is spatially related to displayed target symbol 230*a* because each is displayed in the same top row of the symbol matrix of the gaming device 10*a*. In this embodiment, the gaming device indicates the spatially related magnetic symbol by displaying a starburst identifier as encircling the magnetic symbol. The game information display area 210 indicates that a new magnetic symbol was generated for the play of the game, and that the indicated magnetic symbol is spatially related to a target symbol. The game information display area further indicates that the gaming device 10*a* will shift that magnetic symbol toward the spatially related target symbol and will transform the magnetic symbol into a target symbol.

Figure 4F:
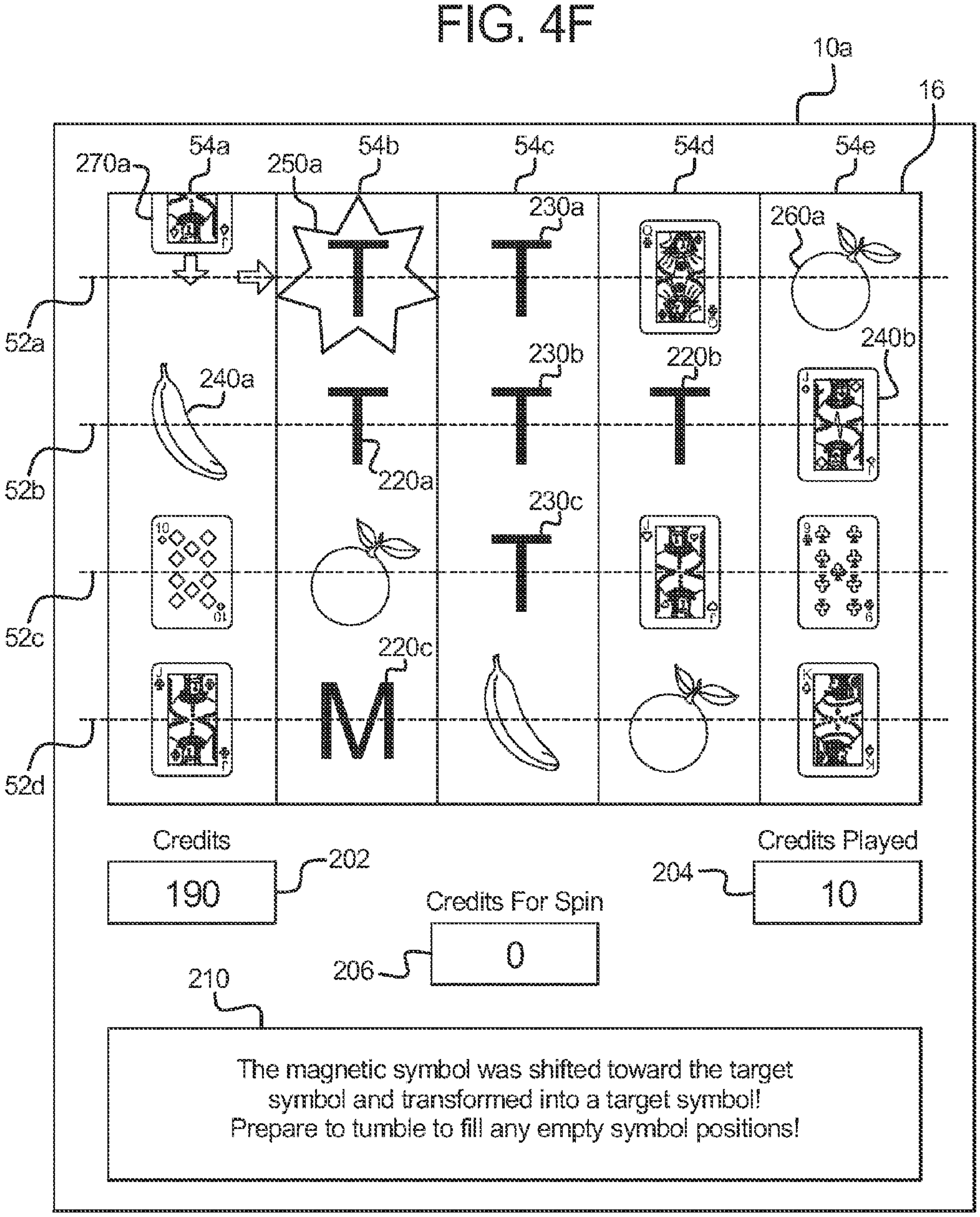

FIG. 4F illustrates the gaming device 10*a* at a point in time after shifting magnetic symbol 250*a* toward the spatially related target symbol 230*a* and after transforming the shifted magnetic symbol 250*a* into a target symbol. In the illustrated embodiment, the gaming device cannot shift any displayed symbol downward to fill the empty symbol position created by shifting magnetic symbol 250*a* since that empty symbol position is in the top row of symbols. Thus, the gaming device generates and displays new symbol 270*a* in the empty symbol position, such as by displaying the new symbol 270*a* as tumbling into the empty symbol position. The game information display area 210 indicates that the magnetic symbol 250*a* was shifted and transformed into a target symbol, and that a new symbol is being generated and displayed as tumbling into the empty symbol position.

Figure 4G:
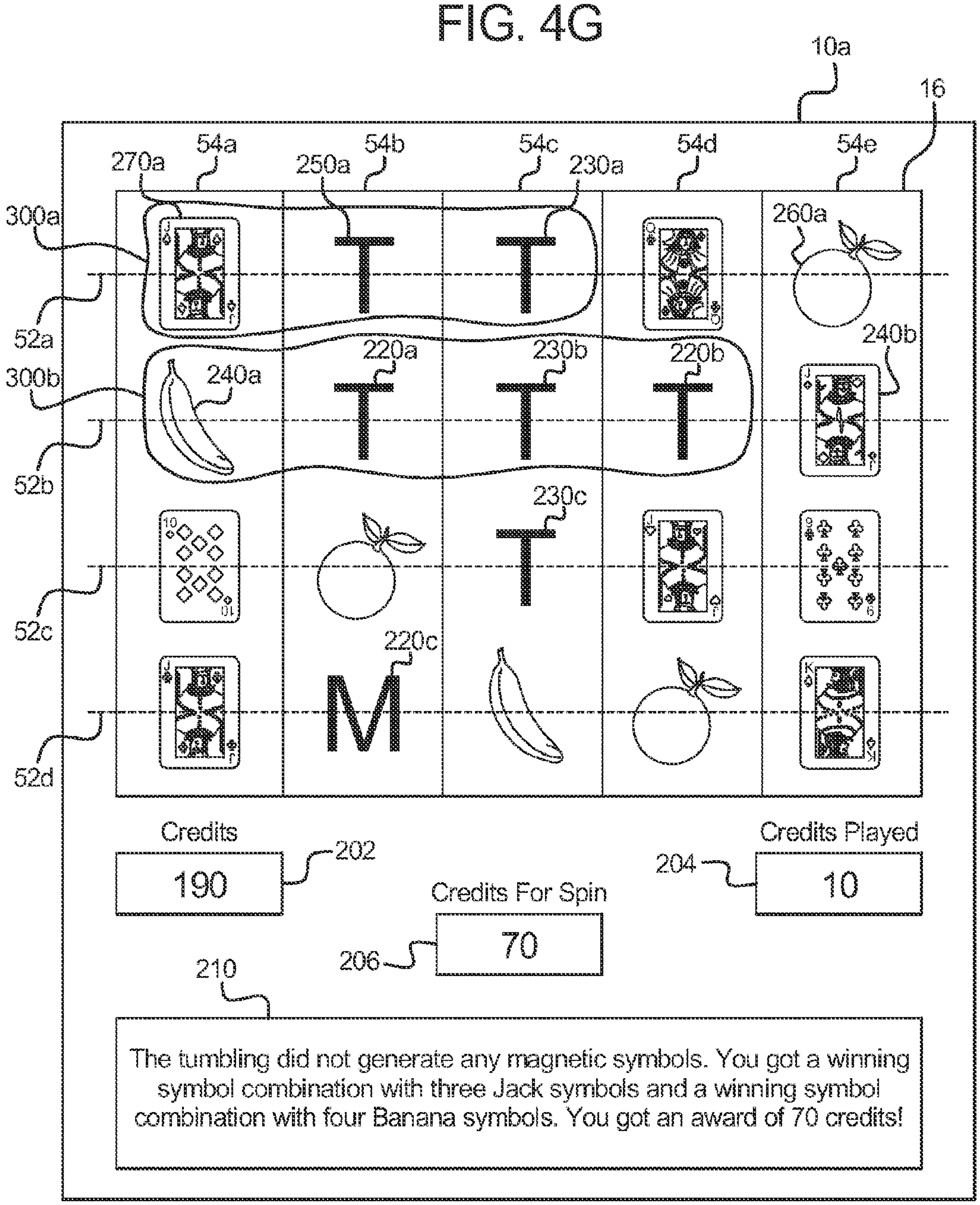

FIG. 4G illustrates a point in time during the play of the game after any empty symbol positions have been filled. Moreover, as illustrated in FIG. 4G, no displayed magnetic symbol is spatially related to any displayed target symbol. In the illustrated embodiment, since there are no spatially related magnetic symbols and target symbols (i.e., there are no magnetic symbols eligible for shifting and transformation), the gaming device 10*a* analyzes the displayed symbols to determine whether any winning symbol combinations are displayed. In the illustrated embodiment, the gaming device determines that two winning symbol combinations 300*a* and 300*b* are displayed for the play of the game. Specifically, since the gaming device 10*a* in the illustrated embodiment determines that a winning symbol combination is any symbol combination which includes three or more of the same symbol (of which zero, one, or more may be a target (i.e., wild) symbol) wherein one of the symbols is displayed in reel 54*a*, the gaming device determines that a winning combination 300*a* of one Jack symbol and two target symbols is displayed. The gaming device also determines that a winning combination of one Banana symbol and three target symbols is displayed. In the illustrated embodiment, the gaming device provides an award of thirty credits for winning symbol combination 300*a* and an award of forty credits for winning symbol combination 300*b*. Thus, the gaming device indicates in credits for spin area 206 that a total award of seventy credits have been won for the current play of the game. The game information display area 210 of FIG. 4G indicates that the tumbling performed to fill the empty symbol position illustrated in FIG. 4F did not result in a magnetic symbol. The game information display area 210 further indicates that two winning symbol combinations were generated as described, and that the player won an award of seventy credits.

Figure 4H:
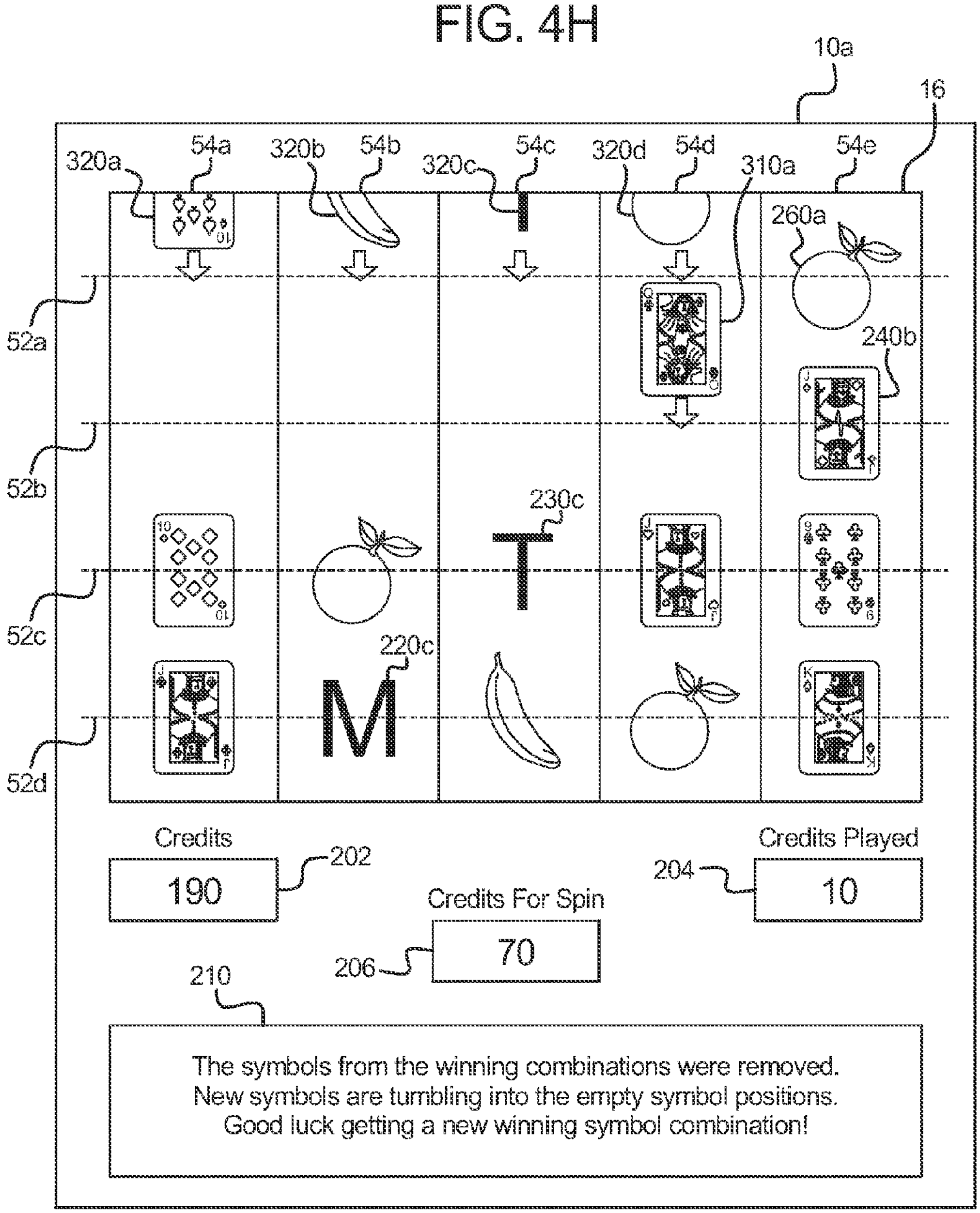

In one embodiment, following the determination of any winning symbol combinations (such as winning symbol combinations 300*a* and 300*b*), the gaming device 10*a* removes each symbol from each displayed winning symbol combination. FIG. 4H illustrates this removal. Specifically, as illustrated in FIG. 4H, the symbols of winning symbol combinations 300*a* and 300*b*, which were displayed along paylines 52*a* and 52*b*, have been removed from the display 16. In the illustrated embodiment, the gaming device shifts any symbols displayed above any empty symbol positions to fill those empty symbol positions. Thus, the gaming device shifts Queen symbol 310*a* downward to fill the empty symbol position created by removing one of the symbols of winning symbol combination 300*b* of FIG. 4G. In the illustrated embodiment, to fill any remaining empty symbol positions (i.e., empty symbol positions of the top row of the symbol matrix, for which a symbol cannot be shifted downward), the gaming device generates and displays a new symbol such as new symbols 320*a*, 320*b*, 320*c*, and 320*d*. It should be appreciated that in the illustrated embodiment, the gaming device shifts such generated symbols downward as far as possible into an empty symbol position to display a cascading or tumbling effect. In the illustrated embodiment, the gaming device generates a target symbol 320*c* and in the symbol position of the top row of the middle reel 54*c*. The game information display area 210 indicates that the winning symbol combinations were removed, and that new symbols are being shifted, generated, and displayed to fill any empty symbol positions.

Figure 4I:
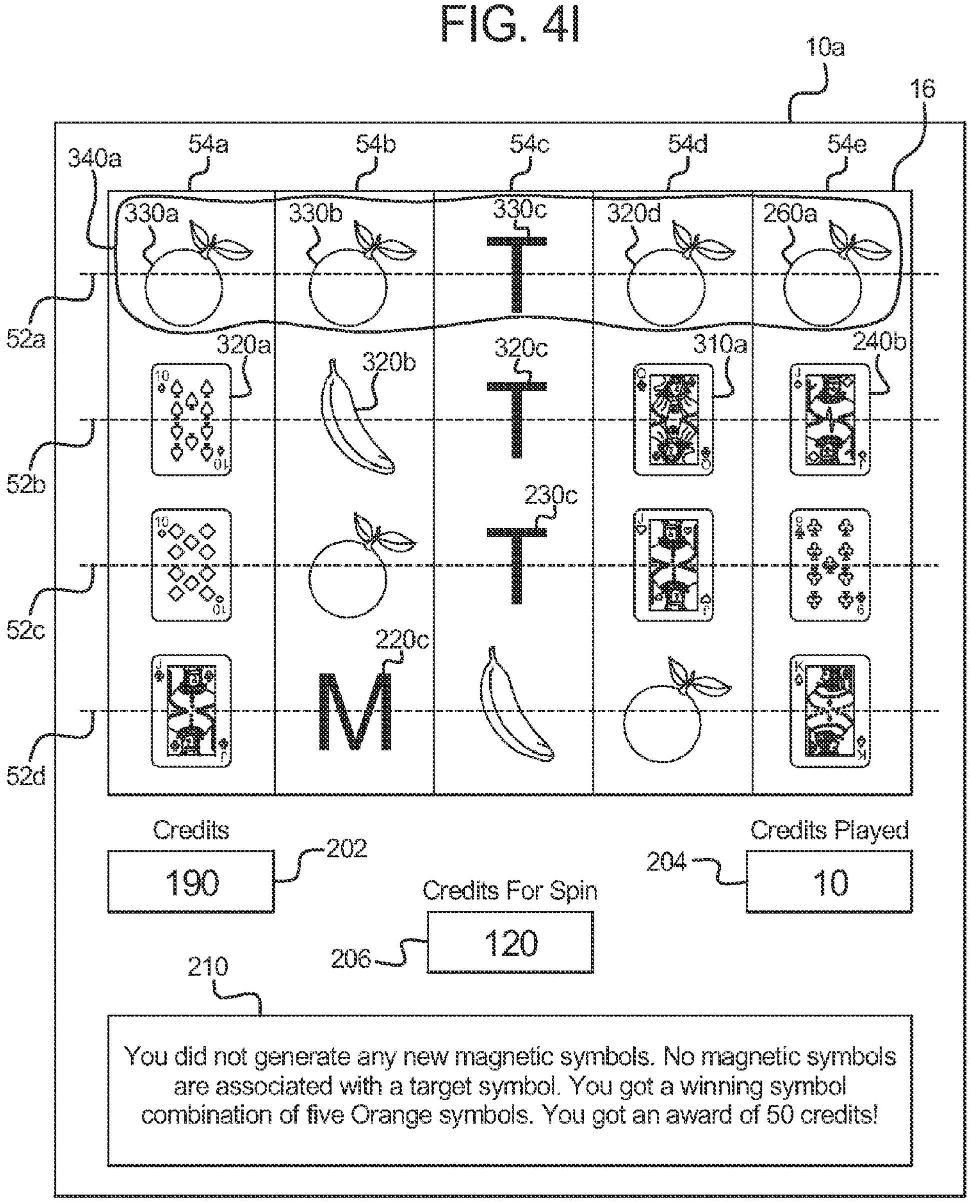

Referring now to FIG. 4I, the gaming device 10*a* is illustrated after a symbol has been shifted or generated for each empty symbol position. In the illustrated embodiment, it should be appreciated that additional symbols 330*a*, 330*b*, and 330*c* were generated subsequent to the point in time illustrated in FIG. 4H, and were displayed in the appropriate symbol positions of the appropriate reels 54*a*, 54*b*, and 54*c*, respectively. In the illustrated embodiment, the gaming device determines that no displayed magnetic symbol is spatially related to a displayed target symbol. Specifically, the only magnetic symbol 220*c* illustrated in FIG. 4I is not displayed in a same row as any target symbol 330*c*, 320*c*, or 230*c*. Thus, the gaming device determines that no shifting and transformation of magnetic symbols is possible. In this embodiment, no empty symbol positions are created which need to be filled by additional shifting or generation of symbols. In the illustrated embodiment, the gaming device therefore determines whether any winning symbol combinations are displayed. Since winning symbol combination 340*a* including four Orange symbols and one target symbol is displayed, the gaming device provides an award of fifty credits based on a winning symbol combination of five Orange symbols. In this embodiment, the gaming device increases the quantity displayed in the credits for spin display area from seventy to one-hundred-twenty credits to reflect this award. The game information display area 210 indicates that no new magnetic symbols are generated and no displayed magnetic symbols are spatially related to a displayed target symbol. The game information display area 210 further indicates that one winning symbol combination was generated including five Orange symbols, and that the winning symbol combination resulted in an award of fifty credits.

Figure 4J:
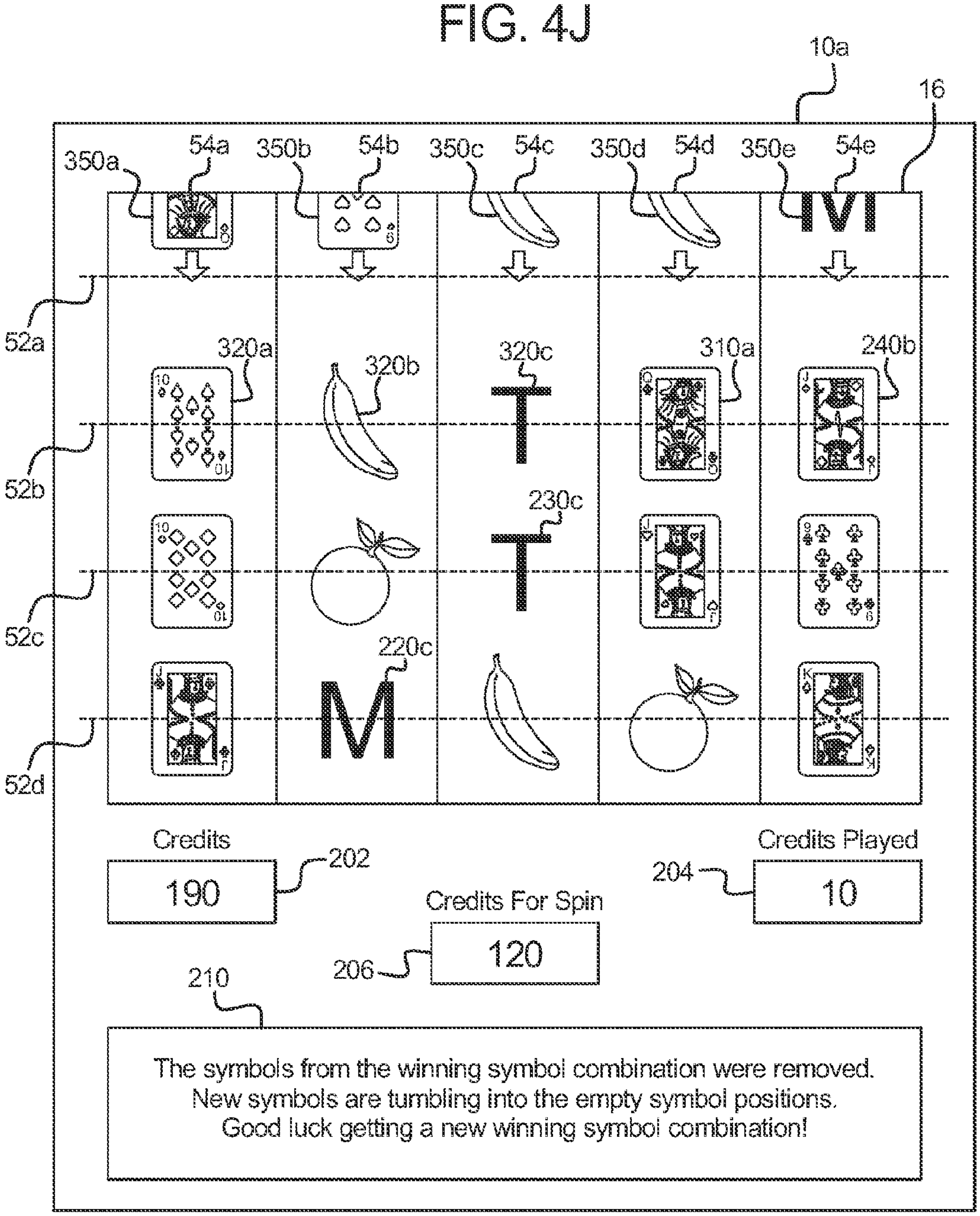

As illustrated in FIG. 4J, after determining that winning symbol combination 340 was generated, the gaming device 10*a* removes the symbols of the winning symbol combination from their symbol positions, resulting in empty symbol positions. Since each of these empty symbol positions is in the top row of the symbol matrix, no displayed symbols can be shifted downward to fill the empty symbol positions. Thus, the gaming device generates symbols 350*a*, 350*b*, 350*c*, 350*d*, and 350*e* to fill the empty symbol positions. The game information display area 210 indicates that the appropriate symbols were removed and the appropriate new symbols generated.

Figure 4K:
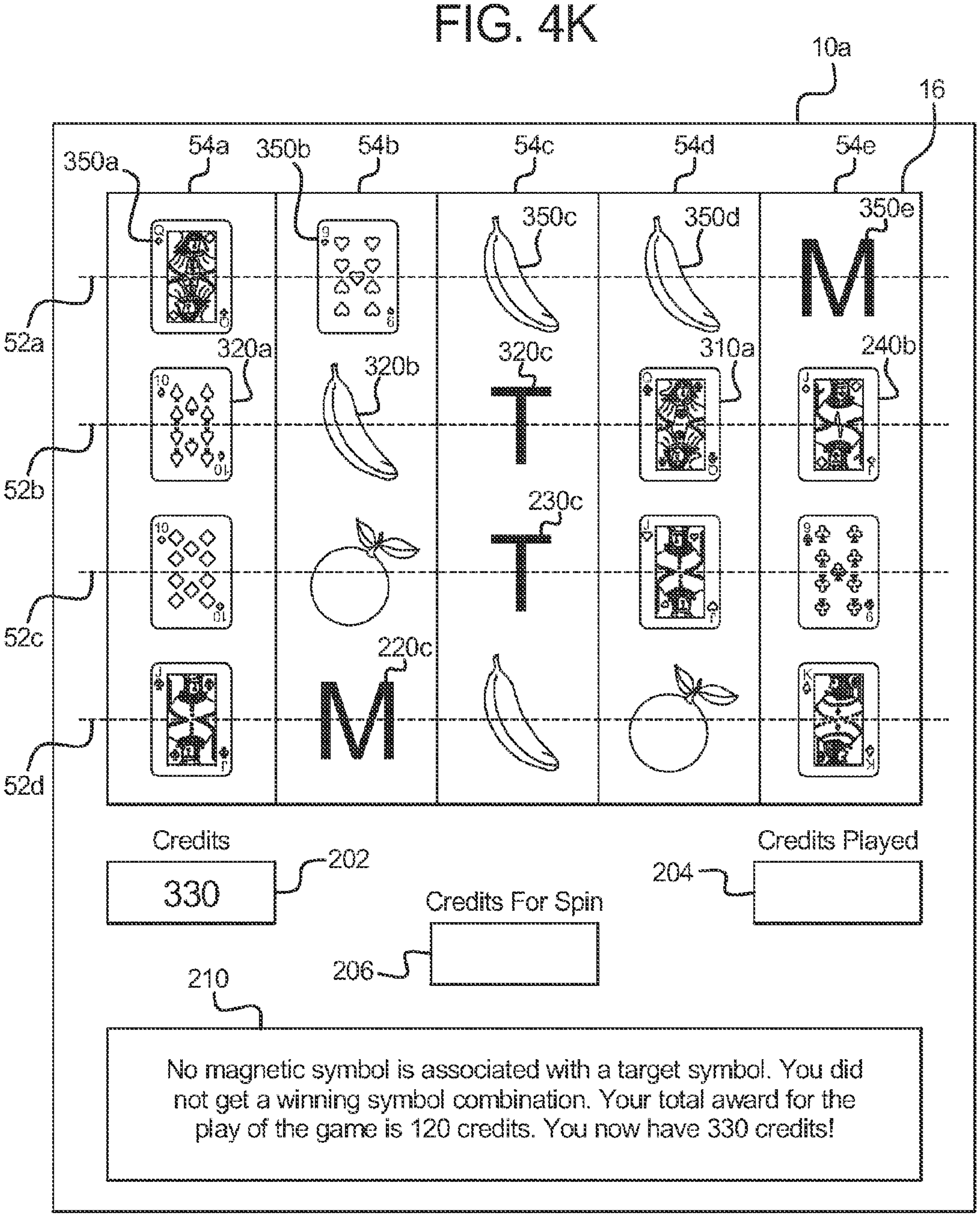

FIG. 4K illustrates the gaming device 10*a* after the generation of symbols 350*a*, 350*b*, 350*c*, 350*d*, and 350*e*. In the illustrated embodiment, the only magnetic symbols displayed in the symbol matrix are magnetic symbol 220*c* and 350*e*. Since no target symbol is displayed in the same row as either magnetic symbol 220*c* or magnetic symbol 350*e*, the gaming device determines that no magnetic symbol is displayed in the designated spatial relationship with a target symbol. Thus, no shifting of magnetic symbols and transformation into wild symbols is possible. In the illustrated embodiment, the gaming device also determines that no winning symbol combinations are displayed. Since no additional symbols are removed and/or shifted, the gaming device provides the player with the current award of one-hundred-twenty credits, adding that total to the one-hundred-ninety credits previously displayed in the credits display area 202. Thus, the player has a total of three-hundred-ten credits to wager on future plays of the game. Since the play of the game has ended at the point in time illustrated by FIG. 4K, the gaming device does not display any amount of credits played in the credits played display area 204, nor does it display any credits won for the spin in the credits for spin display area 206. The game information display area 210 indicates that no magnetic symbols are generated or displayed as spatially related to a target symbol, and that no winning symbol combinations are present. The game information display area further indicates that the award for the play of the game is one-hundred-twenty credits, and that the player has three-hundred-thirty credits to wager on future plays of the game.

In one embodiment, only one of the reels of the disclosed game is associated with a reel strip which includes a plurality of adjacent target symbols. In another embodiment, more than one reel is associated with a reel strip which provides such a stacked symbol effect. In various embodiments, the quantity and location of any reels which provide a stacked symbol effect with respect to the target symbols is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, wherein the gaming system generates symbols for the plurality of symbol positions based on a plurality of reels and associated reel strips, at least one of the reels includes a plurality of adjacent magnetic symbols, resulting in a stacked symbol effect with respect to the magnetic symbols. In various embodiments, whether such reels including adjacently positioned magnetic symbols are utilized is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. In various embodiments wherein such reels including adjacent symbols to produce a stacked symbol effect are utilized, the quantity of such reels which are utilized and which of the reels include a plurality of adjacently positioned magnetic symbols is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In various embodiments, which of any reels utilized by the gaming system that include one or more magnetic symbols and/or one or more target symbols is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. In various embodiments, the quantity of magnetic symbols and/or the quantity of target symbols displayed on any reel is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In another embodiment, the gaming system stores a probability of being treated as a magnetic symbol associated with each of the plurality of symbols. In this embodiment, each of the symbols has the ability to be shifted toward a target symbol, and the gaming system makes a determination for a play of the game whether to treat one or more of the displayed symbols as magnetic symbols for purposes of shifting based on the stored probabilities associated with those symbols. In various embodiments, the probability of being treated as a magnetic symbol associated with each of the plurality of symbols is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. It should thus be appreciated that which of the symbols are magnetic symbols can vary for different plays of the game disclosed herein.

In one embodiment, the gaming system displays target symbols as wild symbols. In this embodiment, the gaming system transforms each shifted magnetic symbol into a wild symbol. In other embodiments, the target symbols are displayed as symbols which are not wild symbols but which increase the probability of generating awards or of generating awards with relatively high award values. In this embodiment, the gaming system transforms the magnetic symbols into the target symbol. In one embodiment, since the magnetic symbols shift toward the target symbols, the gaming system treats shifted magnetic symbols as target symbols for purposes of determining awards, resulting in relatively higher probabilities of winning relatively higher awards. In one embodiment, the gaming system transforms a shifted magnetic symbol into a target symbol, such that for subsequent plays of the game one or more newly generated magnetic symbols can be shifted toward a target symbol which was previously a magnetic symbol.

In one embodiment, the gaming system does not display the target symbols as designated symbols (such as wild symbols). In this embodiment, the target symbol can be any one of the plurality of symbols. In one such embodiment, upon shifting a magnetic symbol which is spatially related to the target symbol, the gaming system transforms the magnetic symbol into the target symbol regardless of whether the target symbol is a designated symbol. In this embodiment, it should be appreciated that shifting magnetic symbols toward target symbols and transforming shifted magnetic symbols into the target symbols results in a plurality of the same symbol in adjacent symbol positions, thus increasing the probability of generating a winning symbol combination or of generating a winning symbol combination with a relatively high value.

In one embodiment, the gaming system transforms any shifted magnetic symbol into an appropriate symbol, such as a wild or target symbol, upon displaying the symbol in the shifted-to symbol position. In another embodiment, the gaming system transforms at least one shifted magnetic symbol into an appropriate symbol prior to shifting, and shifts the transformed symbol into the appropriate, shifted-to symbol position.

In one embodiment, the disclosed gaming system determines whether any winning symbol combinations are generated after each shift of one or more magnetic symbols. In this embodiment, the gaming system provides an award which increases during shifting of magnetic symbols and generation of new symbols to fill empty symbol positions, but does not remove any symbols until no further shifting is possible.

In one embodiment, the gaming system shifts a magnetic symbol toward a spatially related target symbol horizontally along a row of a symbol matrix. In other embodiments, the gaming system shifts magnetic symbols toward target symbols vertically, diagonally, circumferentially around a perimeter of the symbol matrix, or in any other suitable direction. In one embodiment, the gaming system shifts a magnetic symbol toward a related target symbol along one of a plurality of paylines for a play of the game, such as one of a plurality of active paylines based on a player's wager. In various embodiments, the direction in which a magnetic symbol is shifted toward a target symbol is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria. It should thus be appreciated that which of the symbols are magnetic symbols can vary for different plays of the game disclosed herein.

In one embodiment, the gaming system shifts each magnetic symbol into a position adjacent to the target symbol with which the magnetic symbol is spatially related, regardless of the symbol that was previously displayed in the shifted-to symbol position. In a further embodiment, if the symbol previously displayed in the shifted-to symbol position was a magnetic symbol, the gaming system replaces the previously-displayed magnetic symbol with a higher-value magnetic symbol or a multiplier symbol. In one embodiment, the gaming system displays this replacement as a shifted magnetic symbol shifting to a position on top of the displayed magnetic symbol.

In one embodiment, the gaming system disclosed herein is configured to shift one or more symbols downward during a play of the game to fill any displayed empty symbol positions. In various embodiments, the gaming system is configured to shift symbols upward, horizontally, radially outwardly, radially inwardly, diagonally, circumferentially, or in any other direction within the plurality of symbol positions. In various embodiments, the direction in which such symbols are shifted is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, if a play of the game results in each symbol position including either a magnetic symbol or a target symbol, the gaming system provides a bonus or additional award. In one such embodiment, this bonus or additional award is a progressive award. In another embodiment, this bonus or additional award is a physical prize such as a car, a set of airline tickets, a watch, or another suitable physical prize.

In one embodiment, the gaming system determines whether a target symbol is spatially related to a magnetic symbol based on whether the target symbol and the magnetic symbol are displayed in a same row of a symbol matrix. In another embodiment, the spatial relationship is determined based on whether the target symbol and the magnetic symbol are displayed in a same column of the symbol matrix. In various embodiments, other spatial relationships determine whether such symbols are spatially related, such as whether the target and magnetic symbols are displayed within a same diagonal line of the symbol matrix, around a perimeter of the symbol matrix, diagonally adjacent, or any other suitable displayed spatial relationship within the symbol matrix. In various embodiments, whether a magnetic symbol is spatially related to a target symbol is predetermined, randomly determined, determined based on a generated symbol or symbol combination, determined based on a random determination by the central controller, determined based on a random determination at the gaming system, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system is configured to determine whether a magnetic symbol is spatially related to a target symbol based on a plurality of spatial relationships for a play of a game. For example, the gaming system determines that a magnetic symbol is spatially related to a target symbol if the magnetic symbol is in the same row or the same column as the target symbol. In one embodiment, the gaming system thus shifts a magnetic symbol toward a target symbol in one or more of a plurality of directions, such as along a row or along a column. It should be appreciated that such multiple directional shifting in various embodiments increases player excitement and enjoyment because players do not realize the full impact of generating additional magnetic and/or target symbols for a play of the game.

In one embodiment, the gaming system does not remove each symbol from each determined winning symbol combination. In one such embodiment, the gaming system only removes non-magnetic, non-target symbols. In another embodiment, the gaming system only removes non-target symbols. In various embodiments, which symbols are removed from winning symbol combinations is predetermined, randomly determined, determined based on a generated symbol or symbol combination, determined based on a random determination by the central controller, determined based on a random determination at the gaming system, determined based on one or more side wagers placed, determined based on the players primary game wager, determined based on time (such as the time of day), determined based on an amount of coin-in accumulated in one or more pools or determined based on any other suitable method or criteria.

In one embodiment, the gaming system does not replace a symbol when shifting a magnetic symbol toward a spatially related target symbol. In this embodiment, the gaming system moves the symbol displayed in the shifted-to position to another position of the symbol matrix, such as to the shifted-from position. In one embodiment, the gaming system removes each symbol in a symbol position through which the magnetic symbol is shifted. In another embodiment, the gaming system replaces each symbol in a symbol position through which the magnetic symbol is shifted with the magnetic symbol. It should be appreciated that in these embodiments, the gaming system increases player excitement and enjoyment by displaying additional magnetic symbols, or by providing additional opportunities to generate new symbols, for the play of the game.

In one embodiment, at least one of the plurality of symbols is a terminator symbol. In this embodiment, if the gaming system generates the terminator symbol for the play of the game, the gaming system disables the magnetic symbols and thus ceases to shift magnetic symbols toward target symbols for the play of the game. In one embodiment, upon the generation of the terminator symbol, the gaming system fills any empty symbol positions as described herein and provides an award for any then-displayed winning symbol combinations. In another embodiment, upon a generation of the terminator symbol, the gaming system does not fill any displayed empty symbol positions, but rather determines whether any winning symbol combinations are displayed at the time of the generation of the terminator symbol and provides an appropriate award for such winning symbol combinations.

In one embodiment, the gaming system disclosed herein is configured to shift at least one magnetic symbol away from a spatially related target symbol for a play of the game. In one such embodiment, the gaming system determines whether such a spatial relationship exists, and shifts the magnetic symbol as far as possible away from the spatially related target symbol. For example, if a target symbol is generated in the middle column of the top row of a symbol matrix, the gaming system shifts any magnetic symbols generated in the top row outward toward the left-most or right-most columns of the top row. As discussed above, it should be appreciated that the gaming system may shift symbols away from the target symbol in any suitable direction, such as along a row of a symbol matrix, along a column of a symbol matrix, or along an active payline for a play of the game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

a plurality of input devices supported by the housing, said plurality of input devices including:

(i) an acceptor, and (ii) a cashout device;

at least one display device supported by the housing;

at least one processor; and at least one memory device which stores a plurality of instructions, which when executed by the at least one processor, causes the at least one processor to operate with the plurality of input devices and the at least one display device to:

(a) if a physical item is received via the acceptor, establish a credit balance based, at least in part, on a monetary value associated with the received physical item, (b) display a plurality of symbol positions, (c) display one of a plurality of symbols at each of the symbol positions, (d) if a determination is to designate at least one of the displayed plurality of symbols as at least one magnetic symbol:

(i) select at least one of the displayed plurality of symbols, (ii) designate each of the selected displayed symbols as magnetic symbols, and (iii) if the displayed symbols include any designated magnetic symbols displayed in a predetermined relationship with any target symbols, for each of said displayed designated magnetic symbols:

(A) shift said designated magnetic symbol toward the related target symbol, said shifting resulting in an empty symbol position, and (B) display one of the plurality of symbols at the displayed empty symbol position, and (e) display any awards associated with any displayed winning symbol combinations, wherein said credit balance is increasable based on any displayed awards associated with any displayed winning symbol combinations, and (f) if a cashout input is received via the cashout device, cause an initiation of any payout associated with the credit balance.

2. The gaming system of claim 1, wherein when executed by the at least one processor if the displayed symbols include at least one designated magnetic symbol not displayed in a predetermined relationship with any target symbols, the plurality of instructions cause the at least one processor to, for each of said at least one designated magnetic symbol, not shift said designated magnetic symbol toward any target symbols.

3. The gaming system of claim 1, wherein each target symbol is predetermined independent of when the display of one of the plurality of symbols at each of the symbol positions occurs.

4. The gaming system of claim 1, wherein when executed by the at least one processor, if the displayed symbols form at least one winning symbol combination, the plurality of instructions cause the at least one processor to:

(i) remove at least one symbol from said at least one displayed winning symbol combination, (ii) display one of the plurality of symbols at each empty symbol position, and (iii) repeat (d) to (e).

5. The gaming system of claim 1, wherein each of the plurality of symbols is associated with a probability of being designated as a magnetic symbol and the determination to designate one of the displayed plurality of symbols as a magnetic symbol is based on the probability associated with said symbol.

6. The gaming system of claim 1, wherein when executed by the at least one processor, the plurality of instructions cause the at least one processor to transform any shifted designated magnetic symbol into another designated symbol following said shifting of said designated magnetic symbol.

7. The gaming system of claim 6, wherein the other designated symbol is a wild symbol.

8. The gaming system of claim 1, wherein when executed by the at least one processor, if determination is to designate at least one of the displayed plurality of symbols as at least one magnetic symbol, the plurality of instructions cause the at least one processor to randomly select said at least one symbol to designate as at least one magnetic symbol.

9. The gaming system of claim 1, wherein any awards include at least one selected from the group consisting of: a quantity of monetary credits, a quantity of non-monetary credits, a quantity of promotional credits, and a quantity of player tracking points.

10. A gaming system server comprising:

at least one processor; and at least one memory device which stores a plurality of instructions, which when executed by the at least one processor, causes the at least one processor to:

(a) cause at least one display device to display a plurality of symbol positions, (b) cause the at least one display device to display one of a plurality of symbols at each of the symbol positions, (c) if a determination is to designate at least one of the displayed plurality of symbols as at least one magnetic symbol:

(i) select at least one of the displayed plurality of symbols, (ii) designate each of the selected displayed symbols as magnetic symbols, and (iii) if the displayed symbols include any designated magnetic symbols displayed in a predetermined relationship with any target symbols, for each of said displayed designated magnetic symbols:

(A) shift said designated magnetic symbol toward the related target symbol, said shifting resulting in an empty symbol position, and (B) cause the at least one display device to display one of the plurality of symbols at the displayed empty symbol position, and (d) cause the at least one display device to display any awards associated with any displayed winning symbol combinations, wherein a credit balance is increasable based on any displayed awards associated with any displayed winning symbol combinations, said credit balance being: (i) increasable via an acceptor of a physical item associated with a monetary value, and (ii) decreasable via a cashout device.

11. The gaming system server of claim 10, wherein when executed by the at least one processor if the displayed symbols include at least one designated magnetic symbol not displayed in a predetermined relationship with any target symbols, the plurality of instructions cause the at least one processor to, for each of said at least one designated magnetic symbol, not shift said designated magnetic symbol toward any target symbols.

12. The gaming system server of claim 10, wherein each target symbol is predetermined independent of when the display of one of the plurality of symbols at each of the symbol positions occurs.

13. The gaming system server of claim 10, wherein when executed by the at least one processor, if the displayed symbols form at least one winning symbol combination, the plurality of instructions cause the at least one processor to:

(i) remove at least one symbol from said at least one displayed winning symbol combination, (ii) cause the at least one display device to display one of the plurality of symbols at each empty symbol position, and (iii) repeat (c) to (d).

14. The gaming system server of claim 10, wherein each of the plurality of symbols is associated with a probability of being designated as a magnetic symbol and the determination to designate one of the displayed plurality of symbols as a magnetic symbol is based on the probability associated with said symbol.

15. The gaming system server of claim 10, wherein when executed by the at least one processor, the plurality of instructions cause the at least one processor to transform any shifted designated magnetic symbol into another designated symbol following said shifting of said designated magnetic symbol.

16. The gaming system server of claim 15, wherein the other designated symbol is a wild symbol.

17. The gaming system server of claim 10, wherein when executed by the at least one processor, if determination is to designate at least one of the displayed plurality of symbols as at least one magnetic symbol, the plurality of instructions cause the at least one processor to randomly select said at least one symbol to designate as at least one magnetic symbol.

18. The gaming system server of claim 10, wherein any awards include at least one selected from the group consisting of: a quantity of monetary credits, a quantity of non-monetary credits, a quantity of promotional credits, and a quantity of player tracking points.

19. The gaming system server of claim 10, which transmits and receives data over a data network.

20. The gaming system server of claim 19, wherein the data network is an internet.

* * * * *